(12) United States Patent
Jend

(10) Patent No.: US 11,311,104 B2
(45) Date of Patent: Apr. 26, 2022

(54) DRYING/STORAGE RACK AND ASSOCIATED METHODS

(71) Applicant: Jend Design LLC, Parker, CO (US)

(72) Inventor: Matthew S. Jend, Parker, CO (US)

(*) Notice: Subject to any disclaimer, the term of this patent is extended or adjusted under 35 U.S.C. 154(b) by 0 days.

(21) Appl. No.: 16/406,086

(22) Filed: May 8, 2019

(65) Prior Publication Data
US 2019/0343275 A1    Nov. 14, 2019

Related U.S. Application Data

(60) Provisional application No. 62/741,896, filed on Oct. 5, 2018, provisional application No. 62/669,845, filed on May 10, 2018.

(51) Int. Cl.
| *A47B 46/00* | (2006.01) |
| *A47L 19/04* | (2006.01) |
| *F16B 2/22*  | (2006.01) |

(52) U.S. Cl.
CPC .............. *A47B 46/00* (2013.01); *A47L 19/04* (2013.01); *F16B 2/22* (2013.01)

(58) Field of Classification Search
CPC ..... A47B 46/00; A47B 73/004; A47B 73/008; A47L 19/04; F16B 2/22
USPC ................................ 211/41.3, 41.6, 113, 116
See application file for complete search history.

(56) References Cited

U.S. PATENT DOCUMENTS

| 98,756 A | 1/1870 | Franklin |
| 243,898 A | 7/1881 | Hill |
| 258,558 A | 5/1882 | Cook |
| 445,099 A | 1/1891 | Traut |
| 538,534 A | 4/1895 | O'Neill |
| 872,771 A | 12/1907 | Clair |
| 906,963 A | 12/1908 | Thompson |

(Continued)

FOREIGN PATENT DOCUMENTS

| BE | 675340 A | 5/1966 |
| CA | 491967 A | 4/1953 |

(Continued)

OTHER PUBLICATIONS

International Preliminary Report on Patentability Notice, PCT/US2019/031231, dated Nov. 19, 2020.

(Continued)

*Primary Examiner* — Patrick D Hawn

(57) ABSTRACT

A rack system for removably supporting a plurality of articles therein includes a membrane for accommodating at least one of the plurality of articles therein and including at least in part a resilient material forming a plurality of petals defining an opening. The system further includes an attachment arrangement configured for attaching to an external surface. The membrane and the attachment arrangement are configured to collaborate to support the membrane at a predetermined distance from the external surface. The plurality of petals are configured for removably holding at least one of the plurality of articles inserted into the opening. In an embodiment, the system includes a sub-frame for providing structural integrity to the membrane. Alternatively, the membrane is at least in part formed of a stiff material surrounding the petals such that the membrane is attachable to the attachment arrangement in a self-supporting manner.

10 Claims, 22 Drawing Sheets

(56) References Cited

U.S. PATENT DOCUMENTS

| | | | |
|---|---|---|---|
| 1,045,583 A | 11/1912 | Mills | |
| 1,807,990 A | 6/1931 | Landers | |
| 1,929,284 A | 10/1933 | Misbach | |
| 1,958,772 A | 5/1934 | Stewart | |
| 1,992,857 A | 2/1935 | Breedlove | |
| 2,121,307 A | 6/1938 | Swift | |
| 2,139,649 A | 12/1938 | Aanerud | |
| 2,193,647 A | 3/1940 | Rush et al. | |
| 2,197,359 A | 4/1940 | Cook et al. | |
| 2,234,715 A | 3/1941 | Whitney | |
| 2,271,206 A | 1/1942 | Pollard et al. | |
| 2,282,767 A | 5/1942 | Peterson | |
| 2,471,680 A | 5/1949 | Gibson | |
| 2,609,035 A | 9/1952 | Jones | |
| 2,626,439 A | 1/1953 | Mack | |
| 2,719,374 A | 10/1955 | Paione | |
| 2,725,147 A | 11/1955 | Vogler | |
| 2,747,914 A | 5/1956 | Lyons | |
| 2,785,919 A | 3/1957 | Grondzik | |
| 2,951,672 A | 9/1960 | Bott | |
| 2,956,687 A | 10/1960 | Robichaud | |
| 3,063,569 A | 11/1962 | Huber | |
| 3,095,000 A | 6/1963 | Hirst | |
| 3,170,213 A | 2/1965 | Thomas | |
| 3,257,695 A | 6/1966 | Frame | |
| 3,365,761 A * | 1/1968 | Kalvig | B25H 3/04 248/113 |
| 3,405,854 A | 10/1968 | Blair | |
| 3,532,222 A | 10/1970 | Madden | |
| 3,603,551 A | 9/1971 | Peterson | |
| 3,749,348 A | 7/1973 | Bartlett | |
| 3,924,749 A | 12/1975 | Weston | |
| 3,981,471 A | 9/1976 | Currier | |
| 4,138,055 A | 2/1979 | Harrison | |
| 4,216,935 A | 8/1980 | Ellefson et al. | |
| 4,267,995 A | 5/1981 | McMillan | |
| 4,325,484 A | 4/1982 | Berry | |
| 4,505,006 A | 3/1985 | Andre | |
| 4,597,496 A | 7/1986 | Kaplan | |
| 4,620,652 A | 11/1986 | Hanlon | |
| 4,644,610 A | 2/1987 | Fish | |
| 4,781,355 A | 11/1988 | Jeantin | |
| 4,818,017 A | 4/1989 | Dykstra et al. | |
| 4,909,401 A | 3/1990 | McConnell | |
| 4,919,381 A | 4/1990 | Buist | |
| 4,943,025 A | 7/1990 | Warner | |
| 5,060,899 A | 10/1991 | Lorence et al. | |
| 5,072,904 A | 12/1991 | Taylor | |
| 5,087,008 A | 2/1992 | Miller et al. | |
| 5,373,939 A * | 12/1994 | Bloomgren | A47F 7/0028 206/341 |
| 5,546,697 A | 8/1996 | Lymberis et al. | |
| 5,579,929 A * | 12/1996 | Schwartz | B01L 9/06 206/446 |
| 5,690,310 A | 11/1997 | Brown | |
| 5,690,852 A | 11/1997 | Saito et al. | |
| 5,749,480 A | 5/1998 | Wood | |
| 6,038,784 A | 3/2000 | Dunn et al. | |
| 6,070,844 A | 6/2000 | Salenbauch et al. | |
| 6,145,905 A | 11/2000 | Carpenito | |
| 6,241,105 B1 | 6/2001 | Pomper | |
| 6,412,735 B1 * | 7/2002 | Mathieu | A47K 1/09 211/66 |
| 6,502,705 B1 | 1/2003 | Ziegler | |
| 6,637,709 B1 | 10/2003 | Guenther et al. | |
| 6,656,514 B1 | 12/2003 | Tubbs | |
| 6,662,734 B2 | 12/2003 | Chang | |
| 6,769,555 B2 * | 8/2004 | Brady | A47F 7/12 211/113 |
| 6,929,223 B2 * | 8/2005 | Hancock | B60R 11/00 211/64 |
| 6,932,223 B1 * | 8/2005 | Lee | B25H 3/04 206/349 |
| 6,938,861 B1 | 9/2005 | Ballard et al. | |
| 7,077,276 B1 | 7/2006 | Romano | |
| 7,131,545 B1 * | 11/2006 | Grogan | A47G 23/0208 211/85.29 |
| 7,204,374 B2 * | 4/2007 | Marek | B25H 3/04 211/70.6 |
| 7,234,602 B2 | 6/2007 | Roberti | |
| 7,287,474 B2 * | 10/2007 | Whitley | F42B 4/20 102/335 |
| 7,415,996 B2 * | 8/2008 | Favreau | A47G 23/0241 141/364 |
| 7,669,721 B2 | 3/2010 | Kemper et al. | |
| 7,690,605 B2 | 4/2010 | Lee et al. | |
| 7,731,135 B2 | 6/2010 | Richter | |
| 7,731,144 B2 | 6/2010 | Kazyaka | |
| 7,846,269 B2 | 12/2010 | Dunn et al. | |
| 7,891,506 B2 | 2/2011 | Kornowski | |
| 8,056,737 B2 * | 11/2011 | Kao | B25H 3/04 211/70.6 |
| RE43,349 E | 5/2012 | Dunn et al. | |
| RE43,635 E | 9/2012 | Dunn et al. | |
| 8,312,887 B2 | 11/2012 | Dunn et al. | |
| D686,044 S | 7/2013 | Solar et al. | |
| 8,567,614 B2 | 10/2013 | Sankey et al. | |
| 8,590,714 B1 * | 11/2013 | Osuna-Valerio | E05G 1/005 211/4 |
| 8,720,703 B1 | 5/2014 | Pressler et al. | |
| 9,204,734 B2 | 12/2015 | Jablonski et al. | |
| 9,416,804 B2 * | 8/2016 | Simakis | B65D 41/00 |
| D785,196 S | 4/2017 | Goldberg | |
| 9,782,803 B2 | 10/2017 | Semans et al. | |
| 9,877,574 B1 | 1/2018 | Chih | |
| 9,963,059 B2 | 5/2018 | Cooper et al. | |
| 10,004,361 B2 | 6/2018 | Beebe et al. | |
| 10,486,899 B1 * | 11/2019 | Stravitz | B65F 1/0013 |
| D880,840 S * | 4/2020 | Gellineau | D2/999 |
| 2004/0079716 A1 | 4/2004 | Hester | |
| 2004/0134866 A1 * | 7/2004 | Jerstroem | A47L 19/04 211/41.6 |
| 2006/0081750 A1 | 4/2006 | Kazyaka | |
| 2006/0180559 A1 | 8/2006 | Roberti | |
| 2007/0163973 A1 | 7/2007 | Smokowicz et al. | |
| 2009/0065373 A1 | 3/2009 | Kornowski | |
| 2010/0033068 A1 * | 2/2010 | Compagnucci | A47B 47/0041 312/245 |
| 2011/0147324 A1 | 6/2011 | Sankey et al. | |
| 2014/0353330 A1 | 12/2014 | Jablonski et al. | |
| 2015/0060373 A1 | 3/2015 | Byeon | |
| 2016/0143485 A1 * | 5/2016 | Rinck | F16M 13/022 211/116 |
| 2016/0331187 A1 | 11/2016 | Beebe et al. | |
| 2017/0174110 A1 | 6/2017 | Cooper et al. | |
| 2018/0008036 A1 | 1/2018 | Chih | |

FOREIGN PATENT DOCUMENTS

| | | |
|---|---|---|
| CA | 585963 A | 10/1959 |
| DE | 1234618 B | 2/1967 |
| DE | 3024414 A1 | 1/1982 |
| DE | 202004009627 U1 | 11/2004 |
| DE | 102005003078 A1 | 8/2006 |
| DE | 202016106853 U1 | 1/2017 |
| EP | 0367559 A2 | 5/1990 |
| GB | 755742 A | 8/1956 |
| JP | 2002104050 A | 4/2002 |
| JP | 2005225543 A | 8/2005 |
| JP | 2006130117 A | 5/2006 |
| JP | 2007284142 A | 11/2007 |
| WO | 2007030100 A1 | 3/2007 |
| WO | 2007063540 A2 | 6/2007 |

(56) References Cited

FOREIGN PATENT DOCUMENTS

WO    2007087089 A2    8/2007
WO    2019217502 A1    11/2019

OTHER PUBLICATIONS

International Preliminary Report on Patentability, PCT/US2019/031231, dated Nov. 19, 2020.
U.S. Appl. No. 61/949,888—Evriholder Products.

* cited by examiner

DRYING/STORAGE RACK AND ASSOCIATED METHODS

FIELD OF THE INVENTION

The present invention relates to racks and, more specifically, to systems and methods for modular, configurable drying and storage racks for objects with a variety of different shapes and sizes.

BACKGROUND OF THE INVENTION

Multiple designs are currently available for racks for drying and storing different objects. Current designs generally are configured to be placed on countertops or tabletops, thus taking up valuable surface area in kitchens, bathrooms, laboratories, and workshops, among others.

For instance, as baby feeding technologies have advanced over the years, parents now use components with sophisticated designs encompassing, for example, bottles, caps, nipples, handles, tube accessories, and breast pump accessories. Many of these components have unique shapes and sizes across different models and brands.

Some solutions for the storage of irregularly-shaped or specialty items already exist, such as stemmed wine glasses and baby bottle components. For instance, there are under-cabinet racks for the storage of stemmed wine glasses, as well as countertop, compartmentalized storage boxes for certain brands of baby bottles. However, these specialized storage solutions only accommodate items for which they were specifically designed, not products in general of other manufacturers or designs.

SUMMARY OF THE INVENTION

In accordance with the embodiments described herein, a rack system for removably supporting a plurality of articles therein is described. The rack system includes at least one flexible insert for accommodating at least one of the plurality of articles therein. The flexible insert is formed of a resilient material. The system also includes a frame for supporting the at least one flexible insert, or the system could be developed in such a way that the membrane is self-supporting and not require an additional frame or sub-frame to dry and store objects The system further includes a bracket arrangement for removably supporting the frame.

In another embodiment, a modular rack system for removably supporting a plurality of articles therewith is described. The rack system includes at least one flexible insert for accommodating at least one of the plurality of articles therein. The flexible insert is formed of a resilient material. The system also includes a frame for supporting the at least one flexible insert, a bracket arrangement for removably supporting the frame, and a dry rack arrangement configured for supporting at least one of the plurality of articles therewith, wherein the dry rack arrangement includes a post, a clip disposed at one end of the post for attaching to the frame, and a petal arrangement disposed at an opposite end of the post from the clip. The petal arrangement is formed of a flexible material.

In another embodiment, the petal arrangement is configured for being inserted into at least one of the plurality of articles and supporting that article from within. In yet another embodiment, the petal arrangement is configured for being inserted through at least one of the plurality of articles and supporting that article from below. In still another embodiment, the petal arrangement includes an opening for inserting at least one of the plurality of articles there through such that the at least one of the plurality of articles is supported by the petal arrangement in the opening by frictional forces. In a further embodiment, the petal arrangement is configured in a series of concentric petals.

In an embodiment a dry rack arrangement for removably supporting an article therewith includes a post and an attachment arrangement, disposed at one of the posts, for attaching the post to a surface. The dry rack arrangement further includes a petal arrangement disposed at an opposite end of the post from the attachment arrangement. The petal arrangement is formed of a resilient material. In a further embodiment, the attachment arrangement includes at least one of a clip, a bracket, an adhesive, a hook-and-loop fastener, a hook, a screw, and a pin.

In an embodiment, a method for removably supporting an article therewith spaced apart from a surface is described. The method includes providing a flexible sheet of a resilient material, the flexible sheet including features for flexibly accommodating the article therewith. The method further includes offsetting the flexible sheet from the surface using a spacing arrangement.

In another embodiment, a rack system for removably supporting a plurality of articles therein is described. The rack system includes a membrane for accommodating at least one of the plurality of articles therein, the membrane including at least in part a resilient material forming a plurality of petals defining an opening. The rack system further includes an attachment arrangement configured for attaching to an external surface. The membrane and the attachment arrangement are configured to collaborate to support the membrane at a predetermined distance from the external surface. The plurality of petals are configured for removably holding at least one of the plurality of articles therein without any additional support mechanism.

In a further embodiment, the rack system includes a sub-frame for providing structural integrity to the membrane. In another embodiment, the attachment arrangement provides structural integrity to the membrane. In an alternative embodiment, the membrane is at least in part formed of a stiff material surrounding the petals such that the membrane is attachable to the attachment arrangement in a self-supporting manner without requiring any other support structure.

DETAILED DESCRIPTION OF EMBODIMENTS OF THE INVENTION

Figure 1:
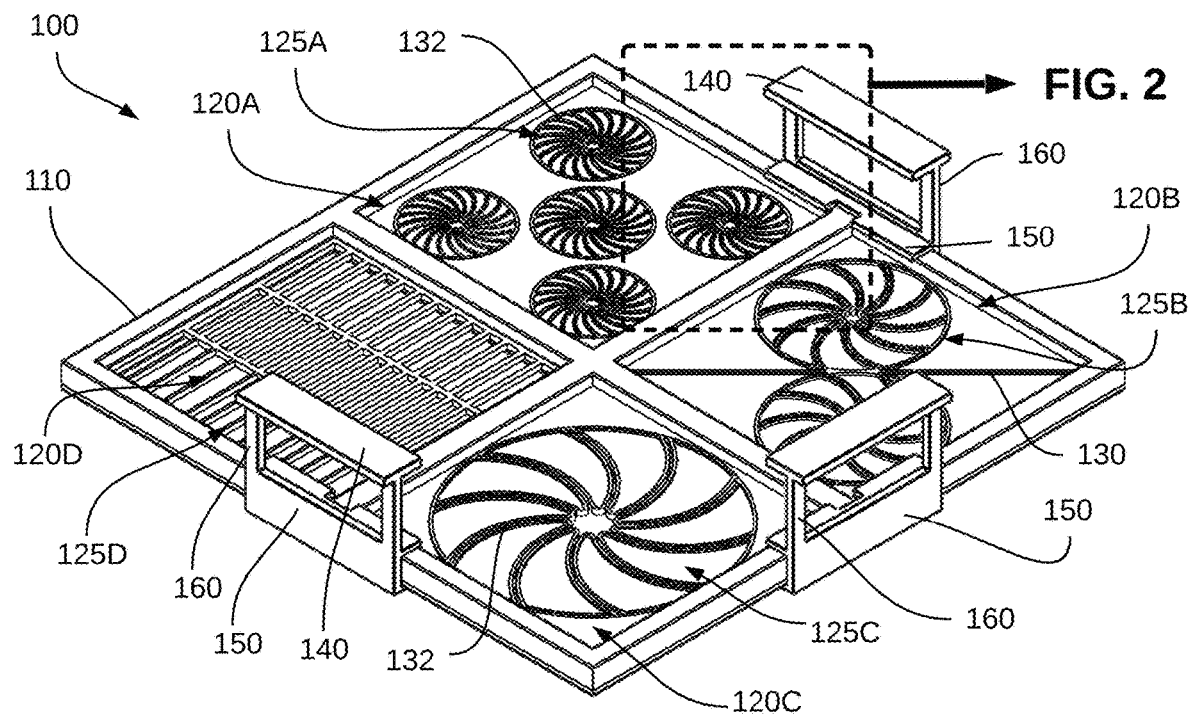
FIG. 1 shows an ISO view of the exemplary rack system, shown here to illustrate the orientation of the under-cabinet attachments, in accordance with an embodiment.

The present invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, and may be abbreviated as "/".

It will be understood that when an element or layer is referred to as being "on," "connected to," "coupled to," or "adjacent to" another element or layer, it can be directly on, connected, coupled, or adjacent to the other element or layer, or intervening elements or layers may be present. In contrast, when an element is referred to as being "directly on," "directly connected to," "directly coupled to," or "immediately adjacent to" another element or layer, there are no intervening elements or layers present.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Accordingly, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

It would be desirable to have a rack for drying and storing a variety of regularly- and irregularly-shaped articles such as, but not limited to, baby bottles, baby bottle accessories and components, cups, prescription pill containers, spice containers, cooking utensils, laboratory materials, crafting supplies (such as for sewing and jewelry making), and tools when not in use. It would also be desirable for the rack to be self-supporting, such as via mounting under a cabinet or a shelf, so as to free up counter and workbench surface area as well as to eliminate clutter.

In an embodiment, there is disclosed a self-supporting rack for drying and storing one or more types of articles, such as after the articles have been washed or need to be stored. The rack is mountable in either a vertical or horizontal orientation to allow the articles to be supported during drying and storage such that the articles can be stored both on a shelf and under a shelf, for instance. Alternatively, the rack can be mounted on a sliding apparatus and attached to, for example, the bottom of a cabinet shelf, thus allowing the easy sliding of the rack outward to remove a bottle, or to place an article in the rack and sliding the rack out of the way. The rack can also be modular, allowing users to link two or more racks together to accommodate a variety of different articles. The rack includes a structurally-solid frame to support both one or more flexible inserts, as well as the weight of the article housed in the rack. The frame accommodates the flexible inserts in a mating way so as to compress the flexible inserts when assembled in the frame. The rack system can also be formed without the frame and be essentially self-supporting. This self-supporting configuration can be configured in many ways, with and without a rigid internal sub frame.

FIG. 1 shows an ISO view of an exemplary rack system 100, in accordance with an embodiment. As shown in FIG. 1, rack system 100 includes a frame 110, which supports flexible inserts 120A, 120B, 120C, and 120D. Each of flexible inserts 120A, 120B, 120C, and 120D includes one or more features 125A, 125B, 125C, and 125D, respectively. Each of features 125A, 125B, 125C, and 125D is configured for holding an appropriately sized article inserted therein. For example, 125A, 125B, and 125C as shown in FIG. 1 include a plurality of petals that can accommodate articles having a generally circular, ovoid, rectangular, or other shapes that are smaller than the diameter of features 125A, 125B, and 125C. Features 125D, which include a plurality of slats forming a plurality of slits, can accommodate a variety of smaller objects, such as nipples, sippy cup handles, straws, water bottle lids, and water bottle mouthpieces. Additional features, such as a rib 130 or structural details 132 for providing additional structural integrity, can also be added to the flexible inserts.

Continuing to refer to FIG. 1, rack system 100 also includes a plurality of mounting surfaces 140, which secure frame 110 to another surface, such as the bottom of a cabinet or a wall, as will be described in greater detail at the appropriate juncture below. In an example, the flexible inserts are modular and can be swapped out, or even removed for cleaning, by the user as desired.

The flexible inserts can be formed, for example, from a flexible silicon-based material or other resilient material that allows flexing of the petals while retaining strength to hold heavier objects. The material forming the flexible inserts can also exhibit grippy or sticky characteristics to help hold the articles therein by friction. Additionally, the flexible inserts can be replaced by inserts formed of a more rigid material. For example, such rigid inserts can be tailored to provide a custom fit (e.g., by snap fit or interference fit) to components manufactured by a specific manufacturer or standard-sized laboratory equipment, such as beakers and vials.

FIG. 1 also illustrate the orientation of the under-cabinet attachments in accordance with an embodiment. As shown in FIG. 1, each one of the mounting mechanisms includes mounting surface 140, a bracket 150, and a pair of standoffs 160 for separating frame 110 from whatever surface on which the rack system is mounted. Standoffs 160 should have sufficient length such that long or large objects, when placed into exemplary rack system, are well supported by flexible inserts 120A-D. For optimum support, an object placed into one of flexible inserts 120A-D should engage all of features 125A-D, respectively.

Figure 2:
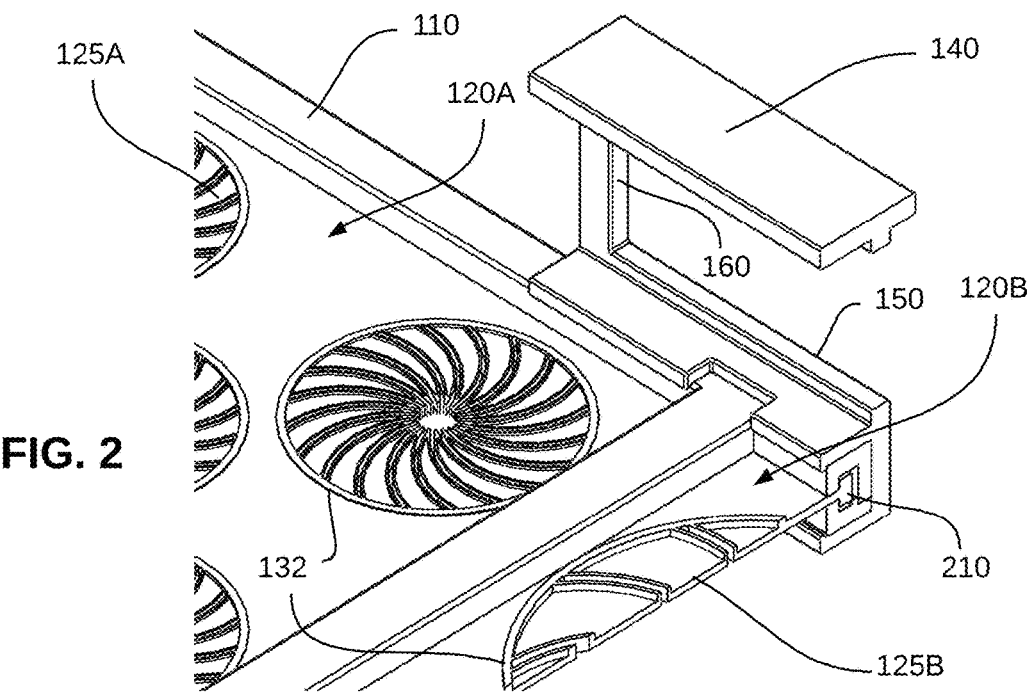
FIG. 2 shows an ISO, partial cutaway view of one of the under-cabinet attachments of the exemplary rack system, in accordance with an embodiment.

FIG. 2 shows an ISO, partial cutaway view of the under-cabinet attachments of the rack system, shown here to illustrate details of the mounting mechanism for attaching frame 110 to another surface, such as under a cabinet or onto a wall. Further details of mounting surface 140, bracket 150, and standoff 160 can be seen in FIG. 2, which shows a portion of the rack system in an expanded, partial cutaway view. As can be seen in FIG. 2, flexible insert 120B includes an edge feature 210 on its perimeter. This edge feature matingly engages with rails in frame 110 such that the flexible insert is securely held by frame 110. The edge feature helps to secure the flexible insert between the first and second pieces of the frame. Additionally, the first and second pieces of the frame slightly compress the flexible insert, so as to further enhance the grip of the frame on the flexible insert when assembled.

Figure 3:
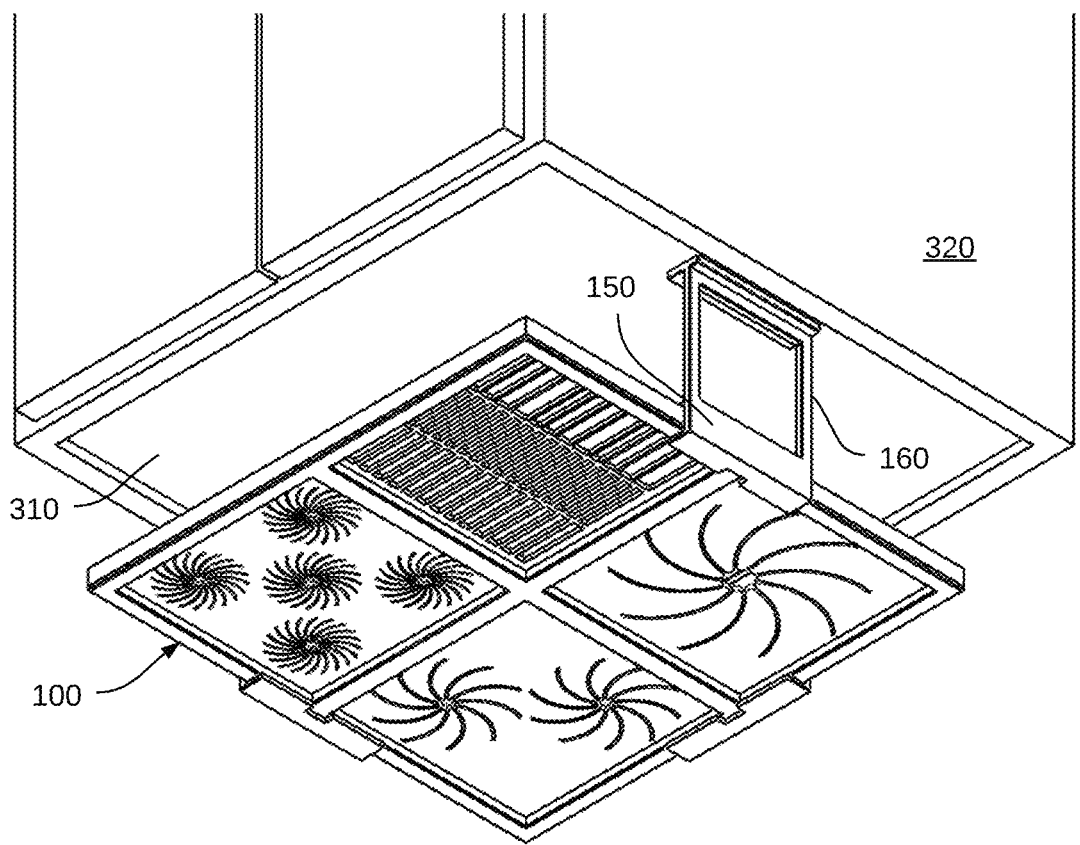
FIG. 3 shows an ISO view of the exemplary rack system mounted under a cabinet, in accordance with an embodiment.

FIG. 3 shows an ISO view of exemplary rack system 100 mounted on an underside 310 of a cabinet 320, in accordance with an embodiment. As can be seen in FIG. 3, brackets 150 are attached to underside 310 by using, for instance, adhesive tape, screws, nails, and the like.

Figure 4:
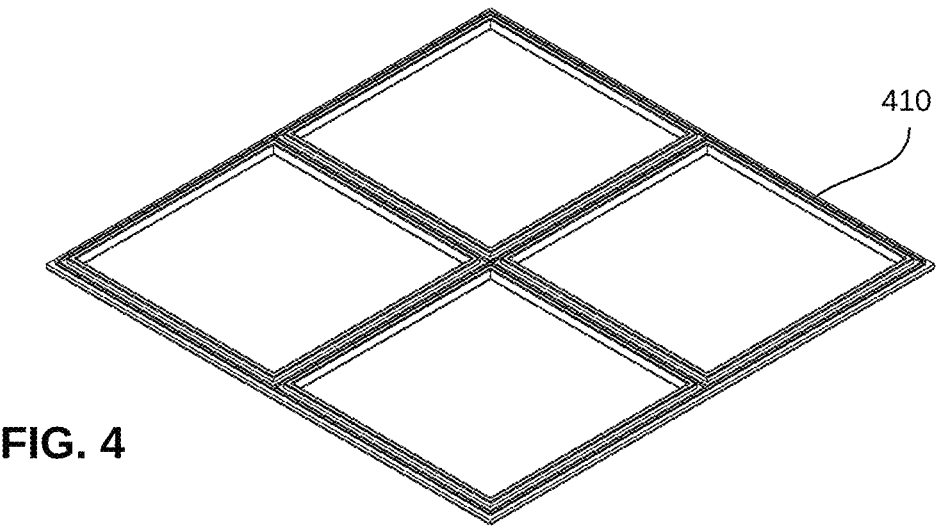
FIG. 4 shows an ISO view of a second piece of a frame for use with the rack system, in accordance with an embodiment.
Figure 5:
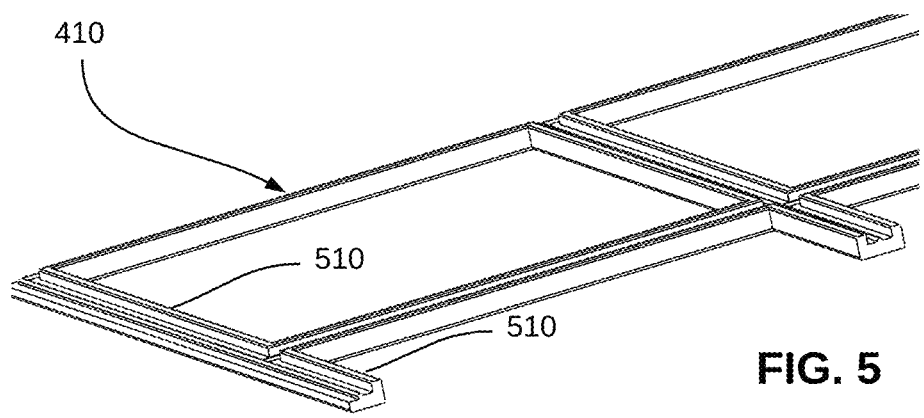
FIG. 5 shows an ISO, partial cutaway view of the second piece of the frame for use with the rack system, in accordance with an embodiment.

FIG. 4 shows an ISO view of a second piece 410 of frame 110 of the rack system, in accordance with an embodiment, with further details shown in the partial cutaway view of FIG. 5. In the exemplary embodiment shown, second piece 410 is in the shape of a window frame with four openings for accommodating flexible inserts therein. Alternatively, each of the openings in second piece 410, as well as the rest of the frame, can be in other shapes, such as rectangles, circles, triangles, hexagons, and other shapes suitable for the objects to be accommodated into the rack system.

In an exemplary embodiment, the frame is made of a rigid material, such as a nylon base material, acting as a frame to support the weight of both the flexible inserts and the articles themselves. Each frame includes a first piece and a second piece, in accordance with an embodiment. As shown in FIG. 5, second piece 410 includes raised inner edges 510, which is configured to hook onto edge feature 210 of the flexible insert positioned thereon.

Figure 6:
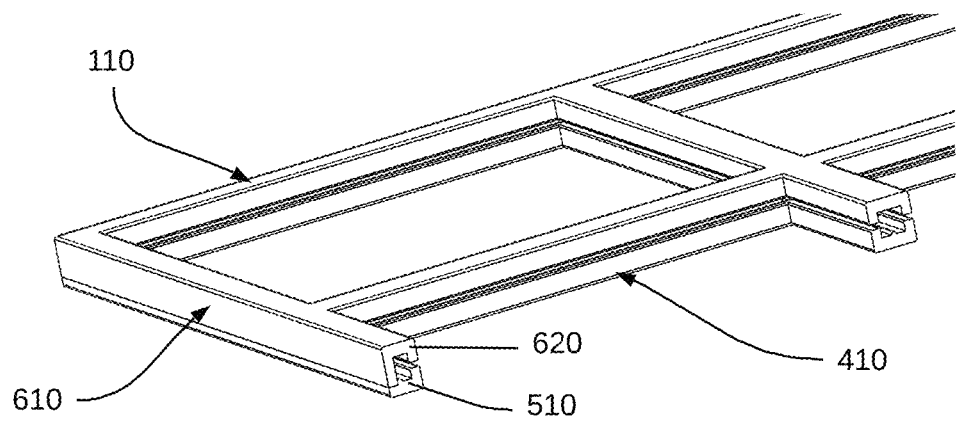
FIG. 6 shows an ISO, partial cutaway view of the assembled frame of the rack system, shown here to illustrate how a first piece fits with the second piece, in accordance with an embodiment.

FIG. 6 shows an ISO, partial cutaway view of the assembled frame of the rack system, shown here to illustrate how a first piece 610 fits with second piece 410, in accordance with an embodiment. First piece 610 also includes raised inner edges 620, which secures edge feature 210 of the flexible insert when placed therein.

Second piece 410 and first piece 610 can be held together in a variety of ways. For example, the first and second pieces can be configured for an interference fit, such as a snap-fit or press-fit configuration, thus creating a single frame to support the articles in the flexible inserts. Alternatively, one or more fixtures, such as pins, screws, dowels, rivets, or nails, can be used to secure the first and second pieces together. In another configuration, a clamping device, either integrated into one or both of the first and second pieces or supplied externally, can be used to press the first and second pieces together. In an embodiment, each of the first and second pieces has a protruding edge that is oversized such that the protruding edges compress the flexible insert into position. Any fastening arrangement used to secure the first and second pieces of the frame should account for the compression so as to ensure a solid grip by the frame on the flexible inserts.

Figure 7:
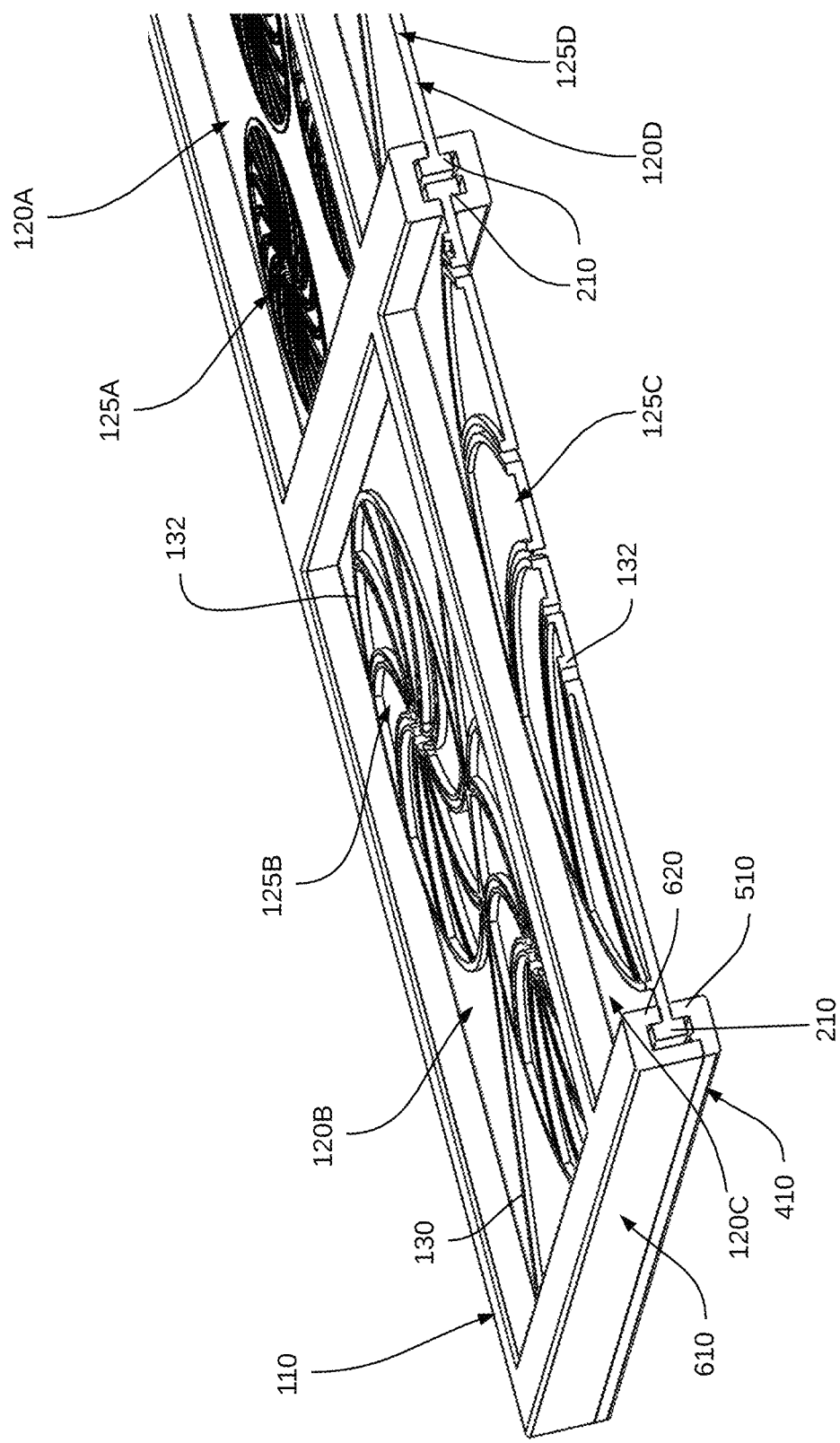
FIG. 7 shows an ISO, partial cutaway view of the assembled frame of the rack system, shown here to illustrate the way the flexible inserts are supported by the assembled frame, in accordance with an embodiment.

FIG. 7 shows an ISO, partial cutaway view of the assembled frame of the rack system, shown here to illustrate the way the flexible inserts are supported by the assembled frame, in accordance with an embodiment. As can be seen in FIG. 7, raised inner edges 620 of first piece 610 and raised inner edges 510 of second piece 410 pinch together around edge feature 210 of the flexible inserts such that the flexible inserts are securely held by frame 110. Also, details of various structural details 132 of features 125B and 125C are visible in FIG. 7. These structural details 132 add structural strength at key points of the flexible inserts, particularly at the edges of the petal features and at the circumference of the features.

Figure 8:
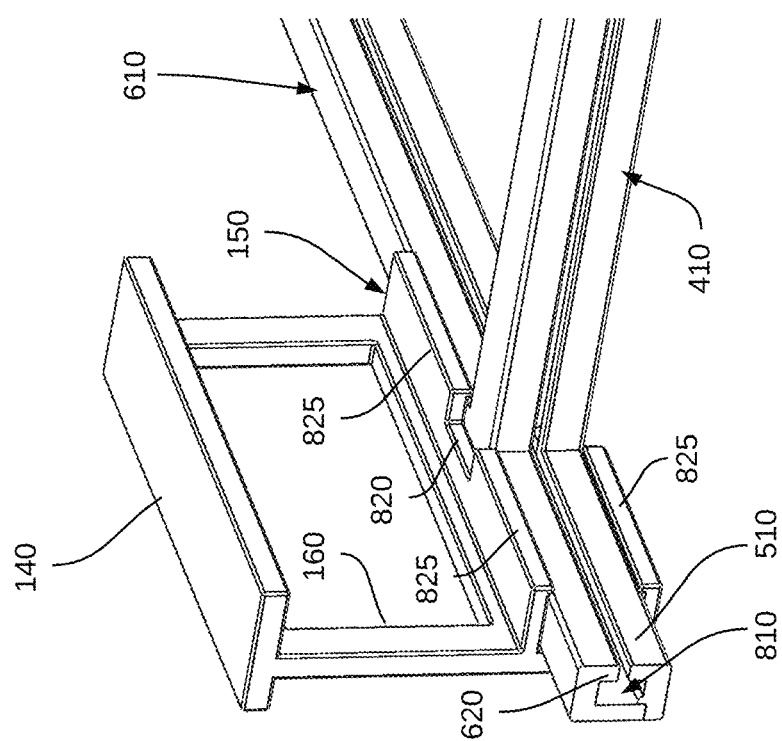
FIG. 8 shows an ISO, partial cutaway view of the assembled frame, shown here to illustrate the way in which the frame is accommodated by a bracket, in accordance with an embodiment.

FIG. 8 shows an ISO, partial cutaway view of the assembled frame, shown here to illustrate the way in which frame 110 is accommodated by bracket 150, in accordance with an embodiment. When first piece 610 and second piece 410 are engaged together, the resulting assembled frame is slidingly accommodated within bracket 150. As can be seen in FIG. 8, raised inner edges 510 of second piece 410 and raised inner edges 620 of first piece 610 form a space 810 for accommodating the edge feature of the flexible insert (not shown in FIG. 8) therein. Also, bracket 150 includes optional features, such as a notch 820 separating overhangs 825, which secure first piece 610 and second piece 410 such that frame 110 is not allowed to move once it is slid into bracket 150.

Figure 9:
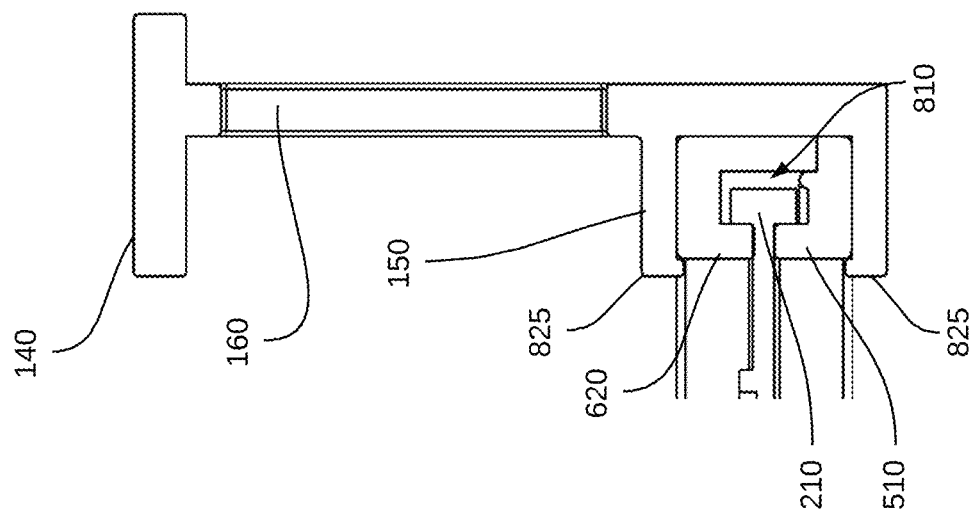
FIG. 9 shows a side, partial cutaway view of the assembled frame with the flexible insert as housed within the bracket of the under-cabinet attachment, in accordance with an embodiment.

The way in which the edge feature of the flexible insert fits into space 810 is better shown in FIG. 9, which shows a side, partial cutaway view of the assembled frame with the flexible insert as housed within bracket 150, in accordance with an embodiment. Edge feature 210 of the flexible insert fits into space 810 formed by first piece 610 and second piece 410. Raised inner edges 510 and 620 of second piece 410 and first piece 610, respectively, slightly compresses the flexible insert around edge feature 210 such that the flexible insert is securely held by frame 110. In turn, frame 110 is slidingly accommodated by bracket 150.

Figure 10:
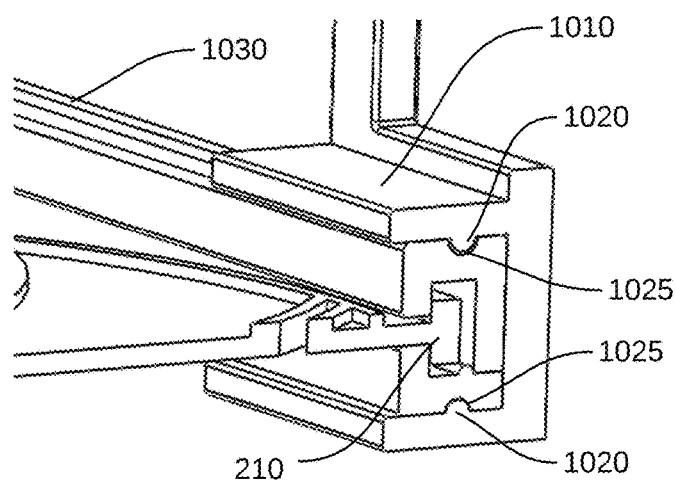
FIG. 10 shows an ISO, partial cutaway view of a bracket that allows sliding of the frame therein, in accordance with an embodiment.

A variation of bracket 150 is shown in FIG. 10. An alternative bracket 1010 includes rails 1020, which is configured to matingly engage grooves 1025 on a frame 1030. The combination of rails 1020 and grooves 1025 serve to contain frame 1030 within alternative side bracket 1010, while allowing frame 1030 to move forward and rearward within alternative side bracket 1010.

Figure 11:
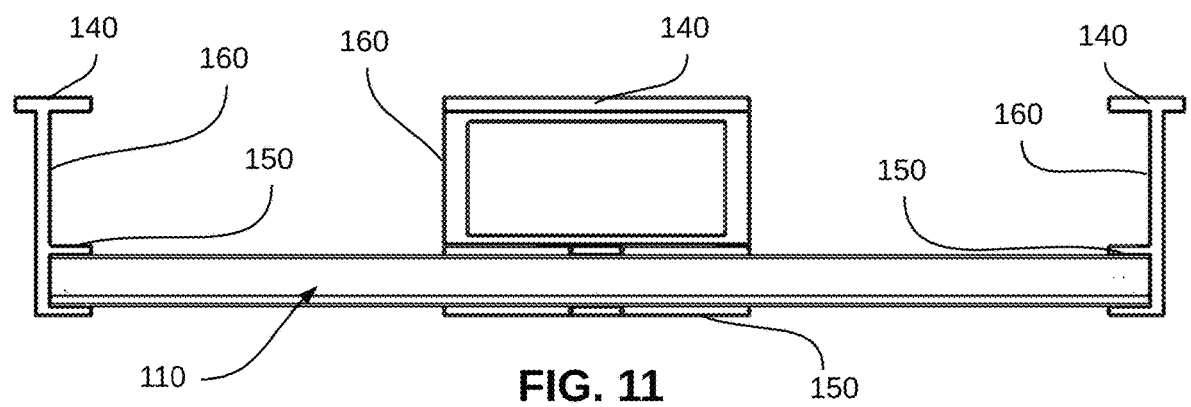
FIG. 11 shows a front view of the assembled frame as supported by multiple brackets, in accordance with an embodiment.

FIG. 11 shows a front view of the assembled frame as supported by multiple brackets, in accordance with an embodiment. When attachment surfaces 140 are attached to a surface under a cabinet, inside a cabinet door, or on a wall, for instance, brackets 150 slidably and removably accommodates frame 110 therein in a horizontal or vertical configuration. By removing frame 110 from brackets 150, flexible inserts 120 can be removed for cleaning or to be swapped with other flexible inserts configured to be compatible with frame 110.

Figure 12:
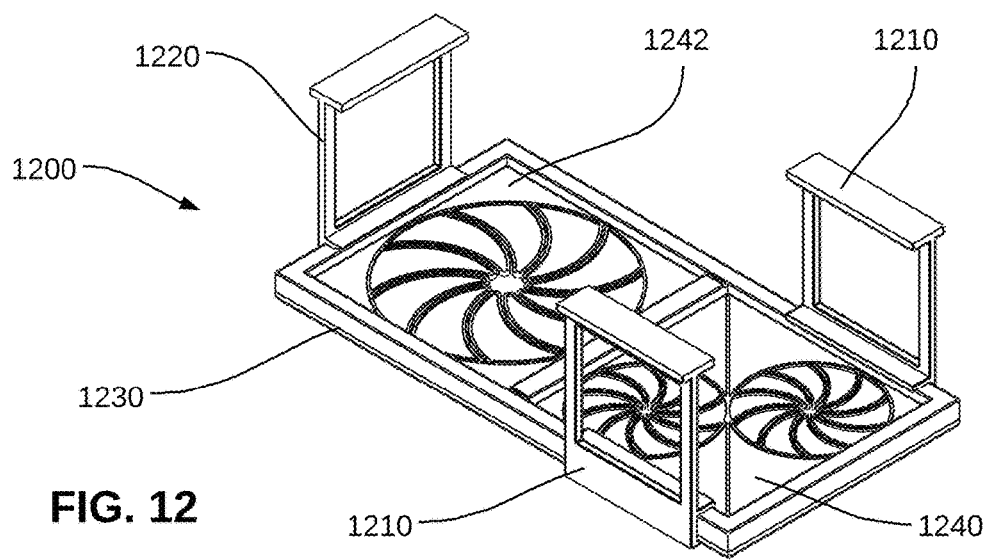
FIG. 12 shows an ISO view of another exemplary rack system, shown here to illustrate the orientation of the under-cabinet attachments in a slidable frame configuration, in accordance with an embodiment.
Figure 13:
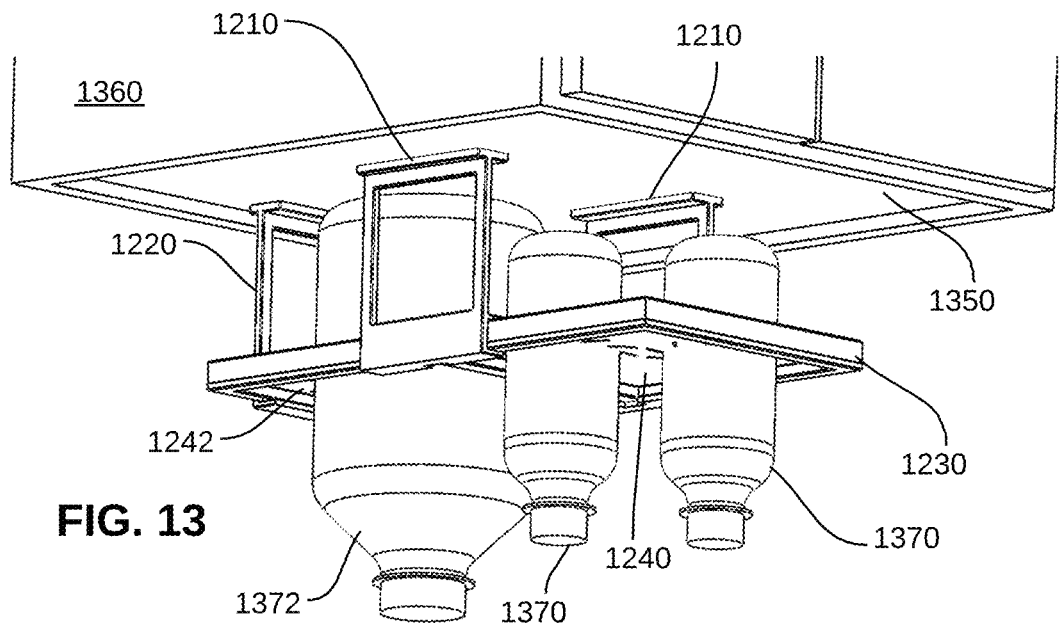
FIGS. 13-14 show ISO views of an exemplary rack system, with the frame in a stored position and a slid-out position, shown here with bottles held therein, in accordance with an embodiment.
Figure 14:
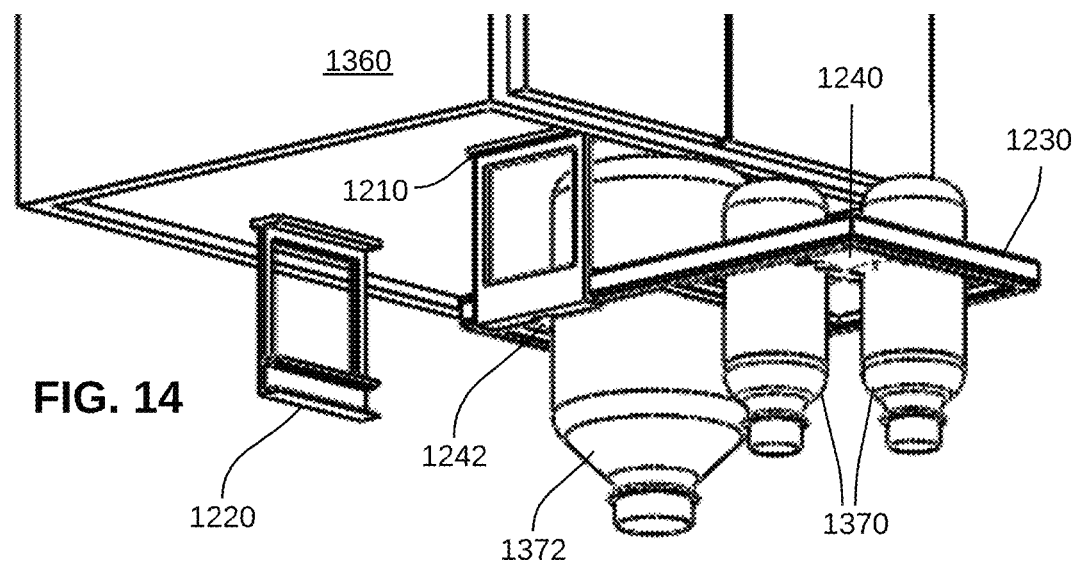

FIGS. 12-14 show various views of an alternative rack system, in accordance with an embodiment. A rack system 1200 includes side brackets 1210 and a rear bracket 1220 configured for slidably accommodating a frame 1230. Frame 1230 is configured for supporting flexible inserts therein. In the example shown in FIGS. 12-14, frame 1230 is configured for supporting two flexible inserts, a first insert 1240 and a second insert 1242, therein. Alternatively, a four-insert frame, such as shown in FIGS. 1-11 can also be used.

Side brackets 1210 and rear bracket 1220 are mountable on a surface such as an underside 1350 of a cabinet 1360, such as shown in FIGS. 13 and 14. FIGS. 13 and 14 show first and second inserts 1240 and 1242, respectively, supporting small bottles 1370 and a large bottle 1372 respectively therein.

Unlike brackets 150 described earlier in conjunction with FIGS. 1-4 and 10-12, side brackets 1210 and rear bracket 1220 do not clamp around frame 1230 to hold frame 1230 rigidly in place. Instead, frame 1230 is slidably held by side brackets 1210 and rear bracket 1220 such that a user can pull frame 1230 at least partly forward, as shown in FIG. 14. Frame 1230 can optionally include bumpers, for instance, to prevent the frame from being pulled all the way out of side brackets 1210. Rear bracket 1220 is configured for cushioning frame 1230 when the frame is pushed rearward into rear bracket 1220.

Figure 15:
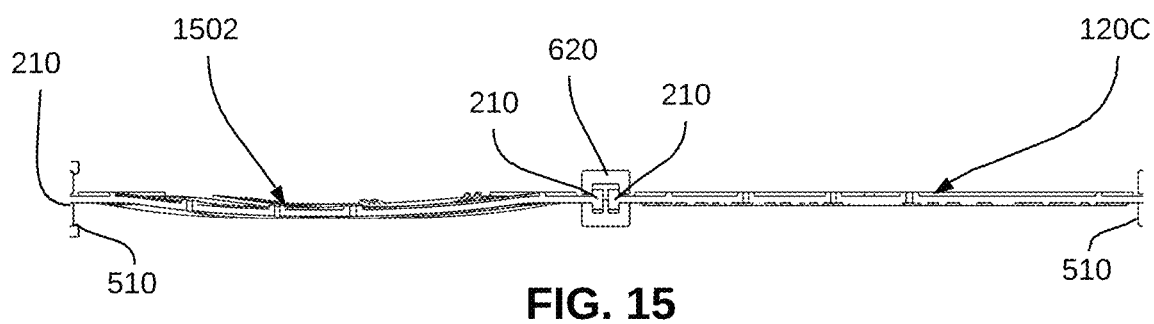
FIG. 15 shows a cross-sectional view of an exemplary flexible insert with a concave shape, in accordance with an embodiment.

An alternative embodiment of the flexible insert is illustrated in FIG. 15. A convex flexible insert 1502 includes some of the same features in previously discussed flexible inserts 120A-D, while having a slight convex shape toward the bottom. As shown in FIG. 15, convex flexible insert 1502 is slightly bowed toward the bottom (i.e., the side from which articles to be held therein are inserted). The slight convex shape, however, itself provides additional frictional grip to support articles inserted therein.

The differences between convex flexible insert 1502 and previously discussed flexible insert 120C can be seen in the cross-sectional view shown in FIG. 15. As seen in FIG. 15, while both convex flexible insert 1502 and flexible insert 120C can be supported in the same frame configuration via edge feature 210, convex flexible insert 1502 sags slightly downward, thus providing additional grip onto whatever article is inserted to be held by convex flexible insert 1502 as compared to the regular flexible insert. Optionally, any and all of the various flexible inserts (e.g., 120A-120D, 1240 and 1242 discussed above, and other variations described below) can be formed in a convex or flat manner.

Figure 16:
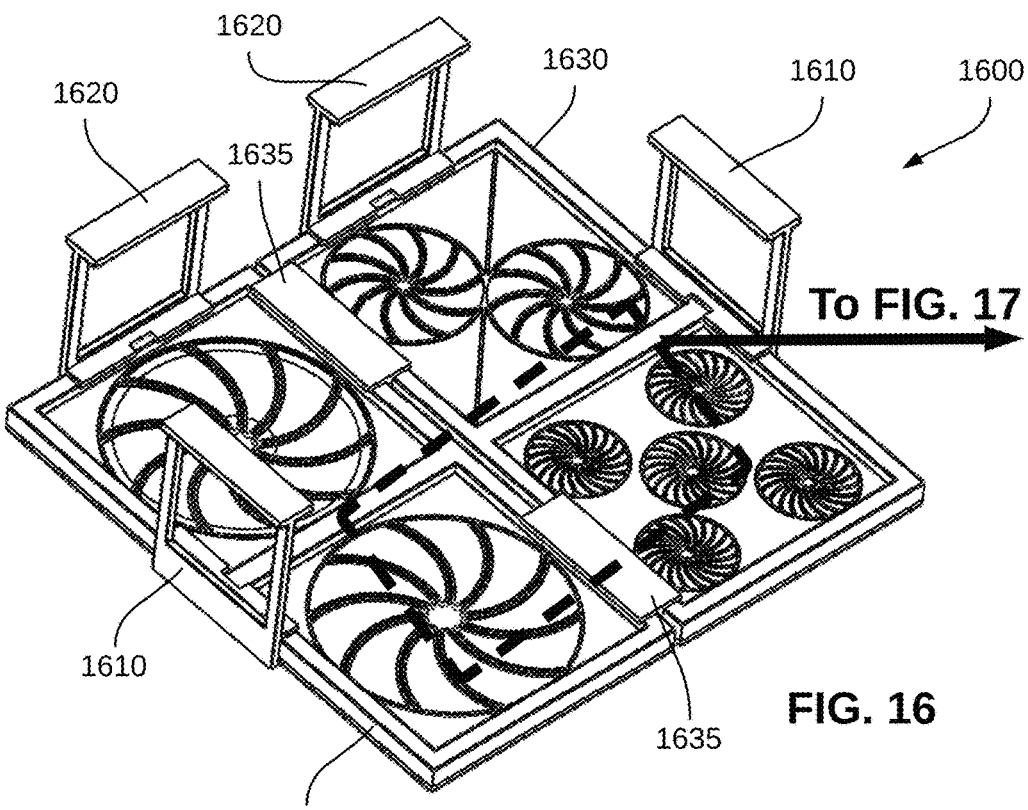
FIGS. 16 and 17 show ISO and inset views of an exemplary, modular rack system and its components, for objects of various shapes and sizes, in accordance with an embodiment.
Figure 17:
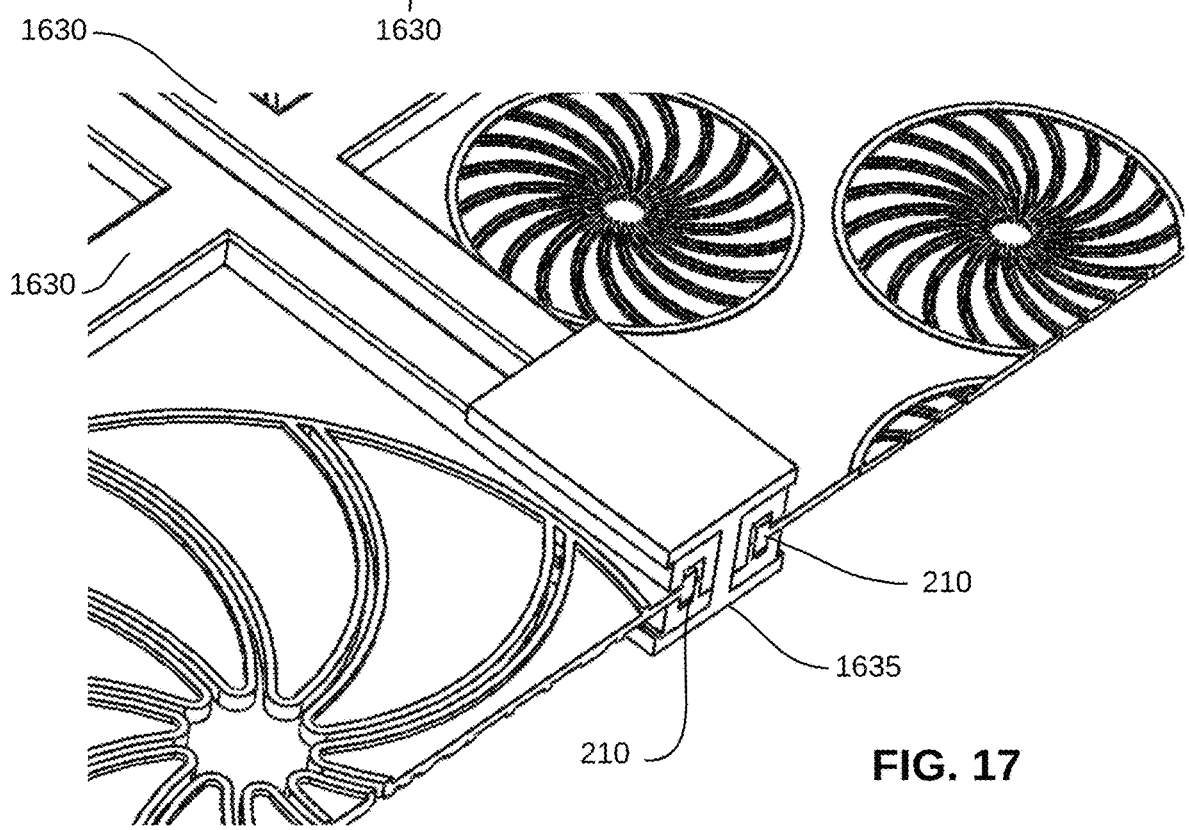

FIGS. 16 and 17 illustrate a modular rack configuration, in accordance with an embodiment. The modular rack configuration combines features of the four-insert frame shown in FIGS. 1-11 with the configurational ease of the two-insert frame shown in FIGS. 12-14, as well as the possibility of multiple types of flexible inserts within two two-insert frames, rather than a single four-insert frame.

Figure 18:
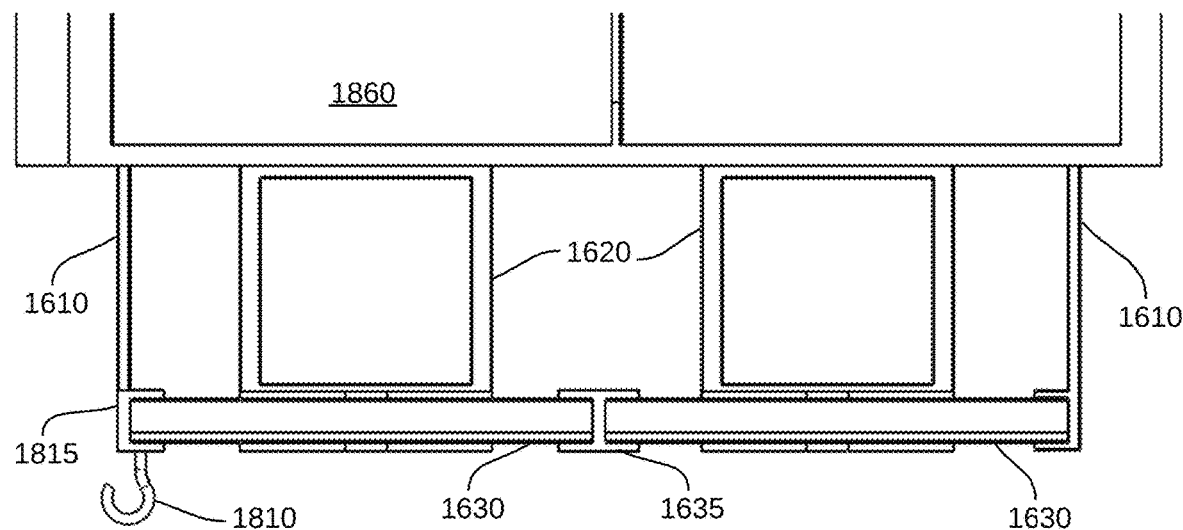
FIGS. 18 and 19 show front and partial cutaway views of an exemplary, modular rack system with an optional hook attachment, in accordance with an embodiment.

As shown in FIG. 16, a modular rack system 1600 includes two side brackets 1610 and two rear brackets 1620 supporting frames 1630. Each one of frames 1630 supports two flexible inserts (either convex or flat) therein. Additionally, modular rack system 1600 includes center brackets 1635, which hold together the two frames 1630. A partial cutaway view showing details of one of center brackets 1635 is shown in FIG. 17 (see dashed box in FIG. 16), which illustrate the way frames 1630 secure edge features 210 of the flexible inserts while being held together by center bracket 1635, in accordance with an embodiment. A front view of modular rack system 1600 mounted under cabinet 1860 is shown in FIG. 18. FIG. 18 also shows an optional hook 1810 attached to frame 1630 by a hook attachment 1815.

Figure 19:
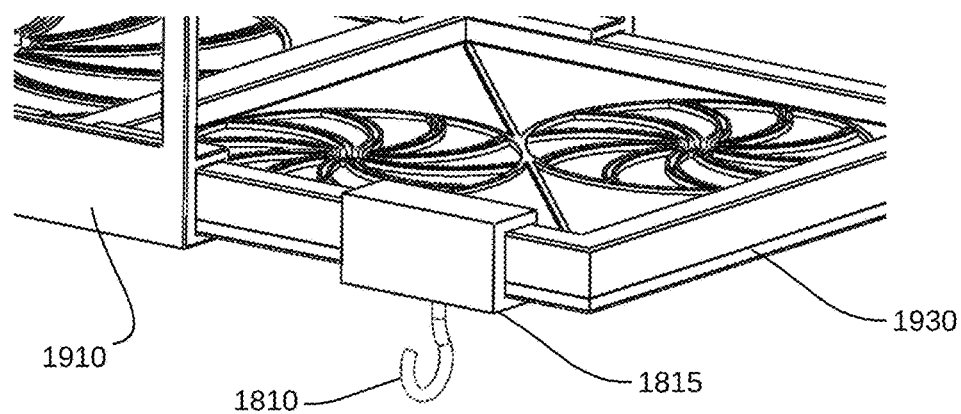

FIG. 19 shows an ISO view of optional hook 1810 attached to via hook attachment 1815 (as previously shown in FIG. 18) to a frame 1930 supported by a side bracket 1910. As shown in FIG. 19, optional hook 1810 and hook attachment 1815 will not interfere with the operation of the rack system regardless of whether side bracket 1910 is configured to rigidly support frame 1930 or to allow frame 1930 to slide forward and rearward. Hook attachment 1815 is configured for being attachable to frame 1930 at any location on the frame.

Figure 20:
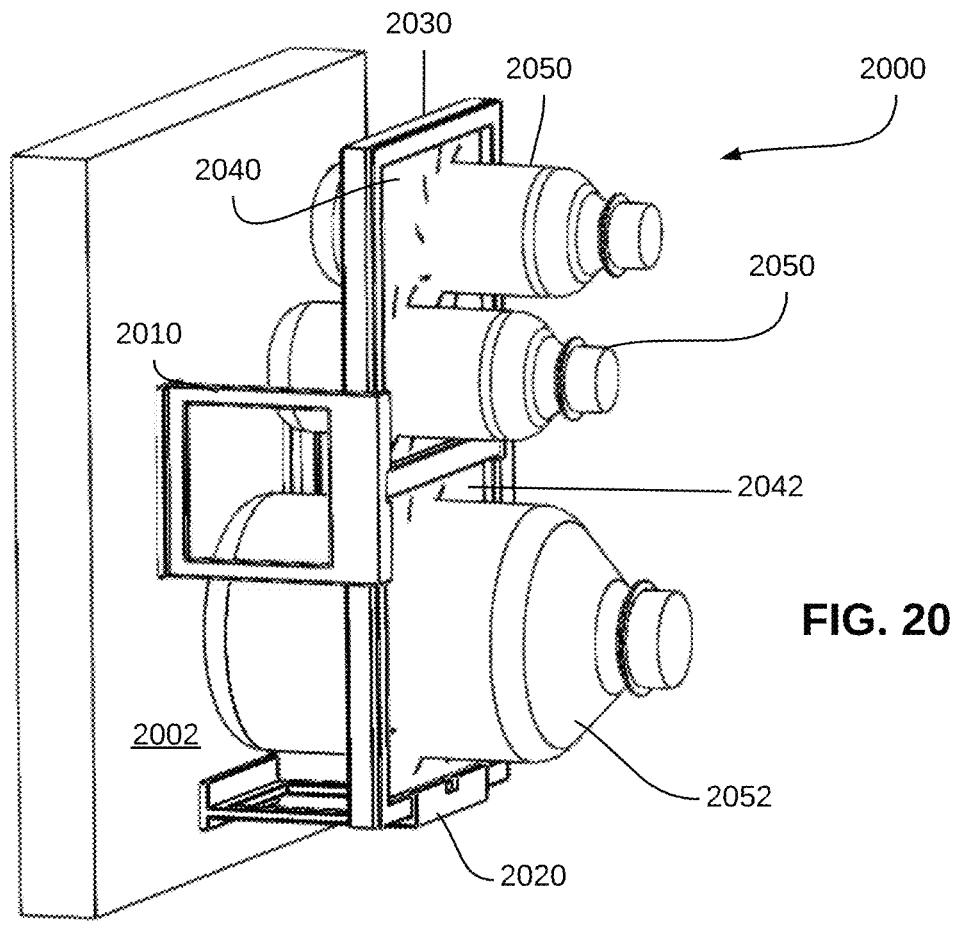
FIG. 20 shows an ISO view of an exemplary rack system mounted on a vertical surface, in accordance with an embodiment.

FIG. 20 shows an ISO view of a two-insert rack system 2000 attached to a vertical surface 2002. In the example shown in FIG. 20, side brackets 2010 and bottom bracket 2020 collectively support a frame 2030 such that inserts 2040 and 2042 can accommodate small bottles 2050 and large bottle 2052 in a horizontal direction. Such an embodiment is useful for mounting onto a wall, the side of a cabinet, and other locations.

Figure 21:
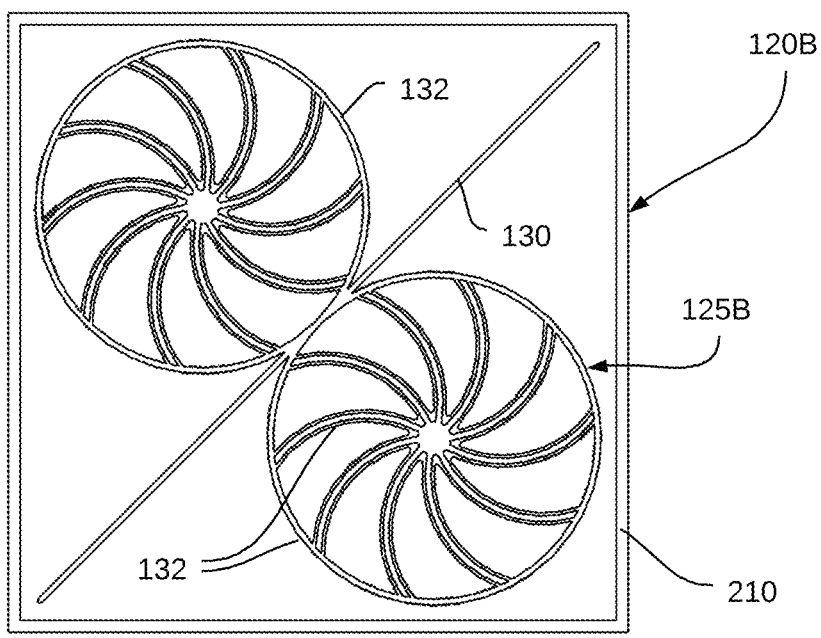
FIG. 21 shows a top view of exemplary flexible insert, for supporting objects of various shapes and sizes therein, in accordance with an embodiment.

Further details of an exemplary flexible insert, in accordance with an embodiment, are shown in FIG. 21. FIG. 21 shows a top view of flexible insert 120B. Flexible insert 120B includes features 125B configured for supporting a variety of articles, such as cups and bottles, among others. Features 125B further includes structural details 132 for adding structural integrity at the edges of petals and along the perimeter of features 125B. Optionally, flexible insert 120B includes rib 130 for adding structural strength to flexible insert 120B.

Figure 23:
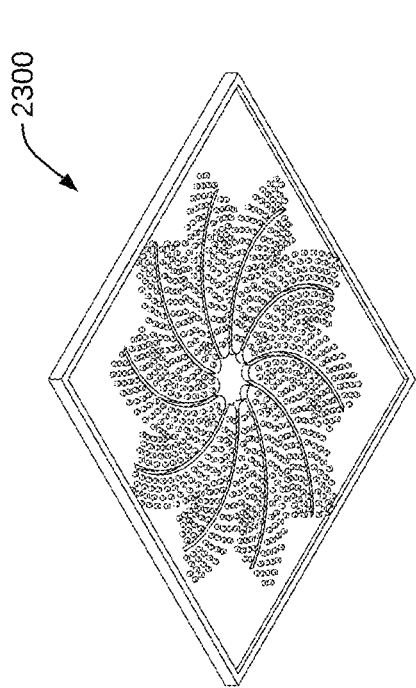
FIGS. 22-25 show design and texture variations for the flexible inserts suitable for use with the rack systems, for objects of various shapes and sizes, in accordance an embodiment.
Figure 25:
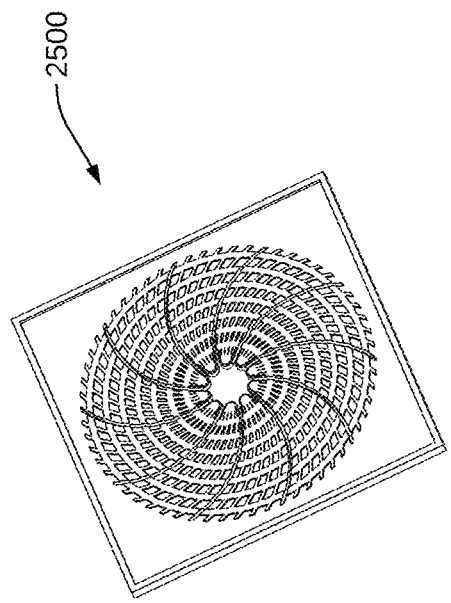
Figure 22:
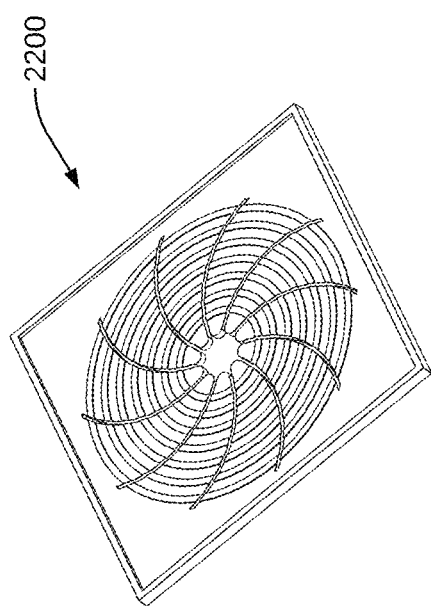
Figure 24:
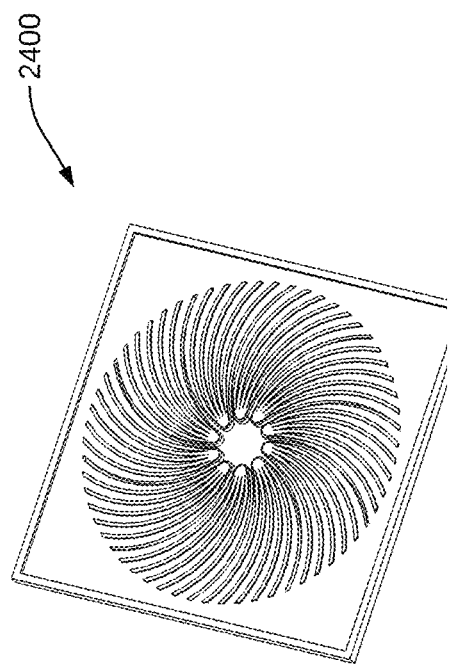

Referring now to FIGS. 22-25, several exemplary designs for the flexible insert are shown. FIG. 22 shows an insert 2200 with a curved petal pattern with concentric circles as structural details for providing additional structural integrity, as well as frictional grip on the bottle or item inserted therein for drying or storage. FIG. 23 shows an insert 2300 again with a curved petal pattern, this time with a plurality of small bumps as structural details. FIG. 24 shows an insert 2400 with a curved petal pattern and a plurality of curved lines, with the same curvature as the petals, as structural details. FIG. 25 illustrates an insert 2500, which include a combination of the concentric circles of insert 2200 and the curved lines of insert 2400.

The rack system described above can be used to hold a variety of articles such as, but not limited to, baby bottles, baby feeding accessories such as nipples, breast pump components, straws and lids, sippy cups, shaker cups, sport water bottles, traveler mugs, plastic cups of various sizes, spice containers, laboratory equipment, such as test tubes and small vials, hand tools, cooking utensils, crafting supplies, such as sewing thread spools, calligraphy tools, bead containers, and scrapbooking tools, medicine containers, cosmetics, personal hygiene products, such as tooth brushes, tooth paste tubes, and lotion bottles, cleaning supplies, stemless wine glasses, and pint glasses, among others.

Additionally, the frame can be constructed such that the flexible inserts are removable, or the flexible inserts can be permanently affixed within the frame. The flexible inserts can be formed of a food grade plastic or silicone that can optionally be washed by hand or in a dishwasher. The flexible inserts can also be designed with suction cups for holding objects for storing and drying, or be configured for holding stemware. The frame can be configured for snap-fitting around the flexible inserts in a removable or non-removable way. Alternatively, the frame can be glued together once the flexible inserts have been inserted therein. Furthermore, additional hooks or hangers can be attached to the frame or even molded into the frame itself for convenience.

It is noted that various components of the rack system described above and below are configured to be modular such that the components are interchangeable. For example, the frame is configured for accommodating the flexible inserts of various designs such as described in FIGS. 21-25 such that a user can swap out the flexible inserts as desired. Additionally, the different components of the rack system, such as the frame, flexible inserts, and other accessories, can be formed of food grade plastic, silicone, or other suitable materials. Furthermore, the various components can be formed of materials that can be boiled, steamed, microwaved, hand-washed, and/or placed in the dishwasher for cleaning.

Figure 26:
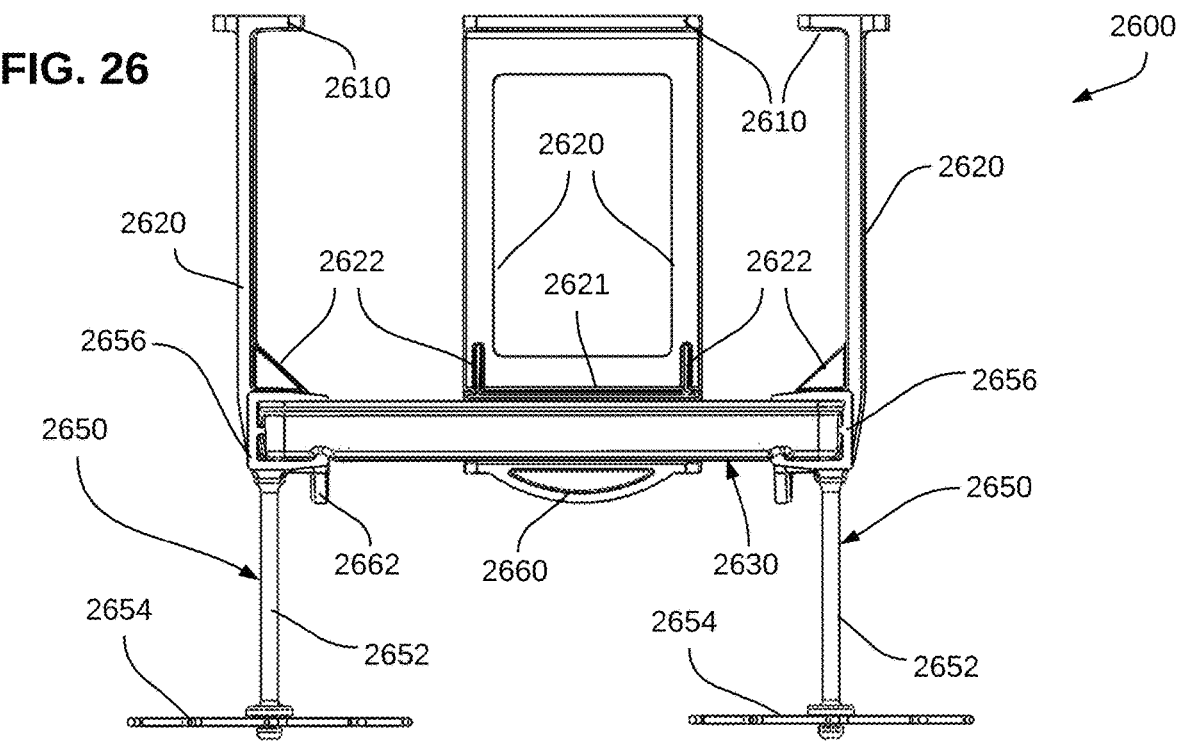
FIG. 26 shows a front view of a modified exemplary rack system including additional dry rack arrangements, in accordance with an embodiment.
Figure 27:
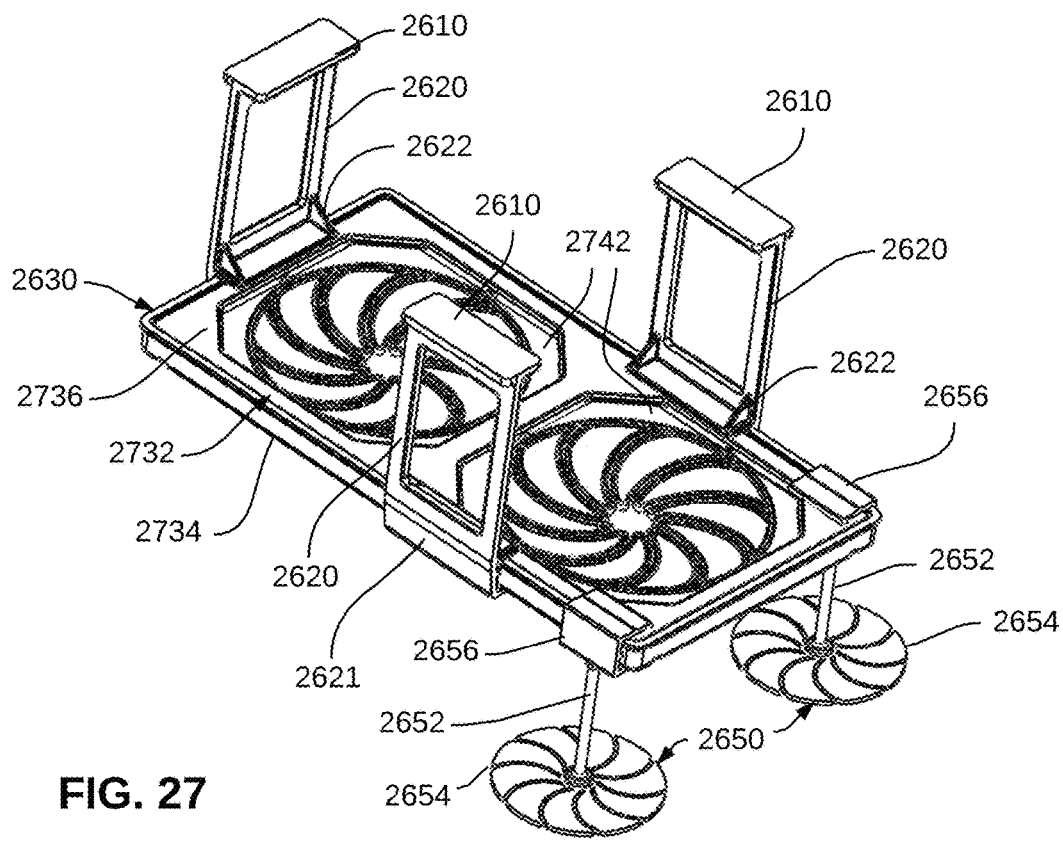
FIG. 27 shows an ISO view of the modified exemplary rack system, shown here to illustrate further details of reinforcement features, in accordance with an embodiment.

Referring now to FIGS. 26 and 27, a front view and an ISO view, respectively, of a modified exemplary rack system including additional dry rack arrangements, in accordance with an embodiment, are shown. As shown in FIGS. 26 and 27, a rack system 2600 includes mounting surfaces 2610, which are configured for attaching rack system 2600 to, for example, the undersurface of a kitchen cabinet. Mounting surfaces 2610 extend into standoffs 2620 and brackets 2621, in a similar fashion as previously described exemplary rack systems. In addition, rack system 2600 includes triangular reinforcements 2622 for further structural stability of the overall mounting mechanism. Triangular reinforcements can optionally be added where mounting surfaces and standoffs come together.

Continuing to refer to FIGS. 26 and 27, brackets 2621 are configured for accommodating a frame 2630 therein. As in previous embodiments, brackets 2621 can slidingly accommodate frame 2630 such that frame 2630 can be slid outward for removal, or brackets 2621 and frame 2630 can include clip features such that, once clipped into brackets 2621, frame 2630 is securely held by brackets 2621.

As shown in FIGS. 26 and 27, rack system 2600 includes dry rack arrangements 2650. Each dry rack attachment includes a post 2652 onto which a petal arrangement 2654 is attached. Each dry rack arrangement includes a clip 2656 for clipping onto frame 2630. In an embodiment, petal arrangement 2654 is an inverted version of previously described flexible inserts in that the petals are attached at the middle and extend outward such that, when placed inside an object such as a water bottle, retainer ring, or gasket, petal arrangement 2654 supports the object from within or underneath. Other petal configurations are possible, as will be described at an appropriate juncture hereinafter. The diameter, thickness, specific material, and shape of petal arrangement 2654 can be varied for different uses, such as for holding bottles of different sizes and/or weights. Unlike the previously described flexible inserts, petal arrangement 2654 are configured for supporting containers in an upright manner, thus are contemplated, in an example, for storage of dry containers rather than for use as a rack for drying wet items. Additionally, a thumb press feature 2660 is optionally provided with bracket 2621 to facilitate the removal of clip 2656 from frame 2630 when so desired. Another optional thumb press feature 2662 is optionally provided with clip 2656 to facilitate the removal of clip 2656 from frame 2630 when so desired.

As is visible in FIG. 27, frame 2630 includes a first part 2732 and a second part 2734, which are configured for supporting one or more flexible inserts 2742. As shown in FIG. 27, first part 2732 includes chamfers 2736, which helps to more securely hold flexible insert 2742 therein as well as help a user in separating second part 2734 from first part 2732. As shown, first part 2734 accommodates flexible inserts 2742 therein, and in turn is accommodated within second part 2734. In an example, second part 2734 and first part 2732 include matching grooves and protrusions such that first part 2732 matingly snaps into second part 2734. In another example, the dimensions of second part 2734 and first part 2732 are configured such that first part 2732 snugly fits into second part 2734 by friction. Alternatively, second part 2734 and first part 2732 can be screwed, pinned, or otherwise held together by an additional fastening arrangement. The modified exemplary rack system can be attached to the underside of a cabinet or a shelf using, for instance, adhesive strips at mounting surfaces 2610. Alternative attachment mechanisms, such as screws, pins, hook-and-loop fasteners, and others, can also be used at mounting surfaces 2610, as long as the attachment mechanism is strong enough to support the rack system as well as any bottles or other objects attached thereto.

Figure 28:
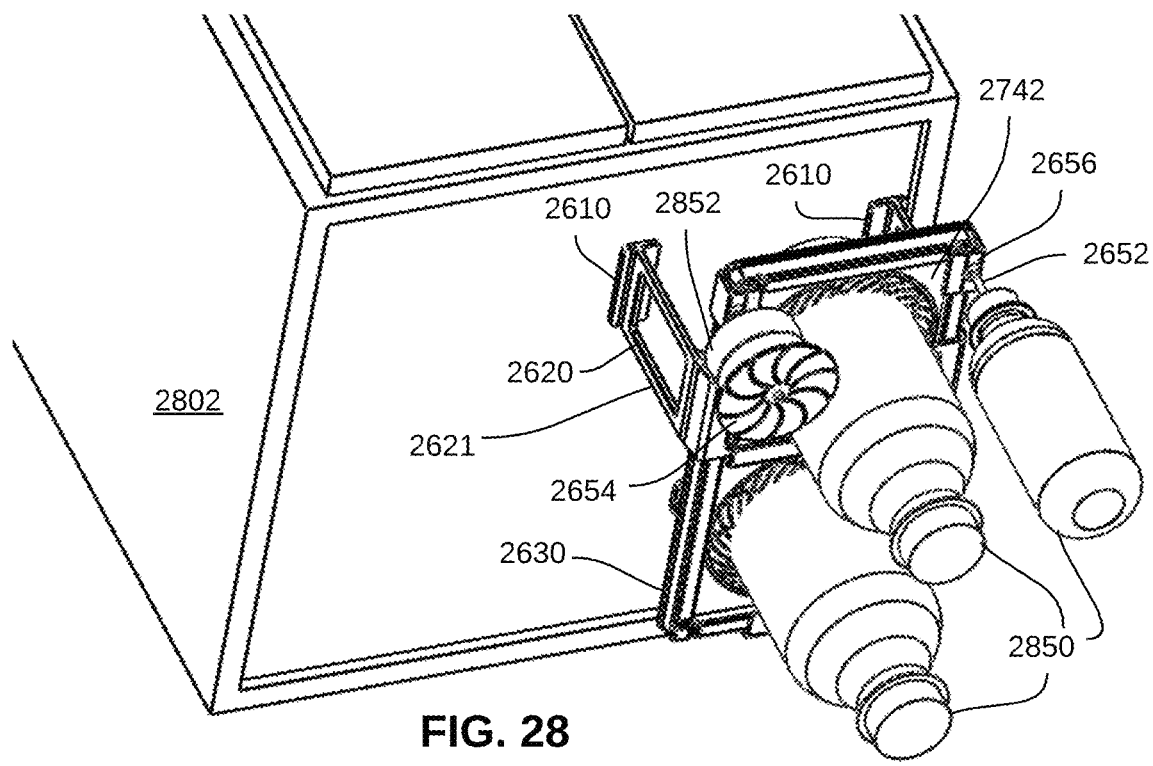
FIG. 28 shows an ISO view from below of the modified exemplary rack system of FIG. 27, in accordance with an embodiment.

FIG. 28 shows an ISO view from below of the modified exemplary rack system of FIGS. 26 and 27, shown here attached under a cabinet 2802 with bottles and retainer rings or nipple flanges supported thereon, in accordance with an embodiment. As shown in FIG. 28, the modified exemplary rack system is supporting several bottles 2850 and retainer rings 2852 (and/or nipple flanges, as used to attach baby bottle nipples to baby bottles) on the dry rack arrangements, as well as in the flexible inserts. Bottles 2850 can be supported in an upright manner by the dry rack arrangements, or in an upside down or upright configuration in the flexible inserts as desired. The diameter of petal arrangements 2654 of the dry rack arrangements should be selected to be larger than the diameter of retainer rings 2852.

Figure 29:
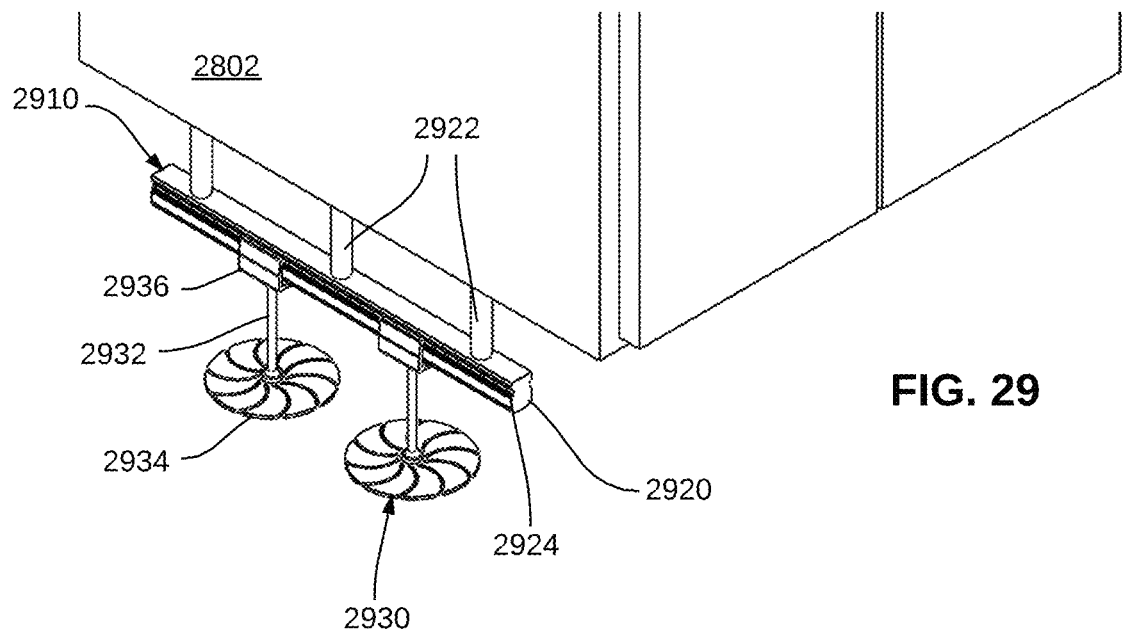
FIG. 29 shows an ISO view of an alternative rail system attached to the underside of a cabinet, in accordance with an embodiment.

FIG. 29 shows an ISO view of an alternative rail system attached to the underside of a cabinet, in accordance with an embodiment. As shown in FIG. 29, alternative rail system 2910 includes a rail 2920 attached to the underside of cabinet 2802 by one or more posts 2922. While FIG. 29 shows alternative rail system 2910 including three posts 2922, the number of the posts can be decreased or increased depending on the type and weight of the items to be supported by the alternative rail system. In the illustrated embodiment, rail 2920 includes grooves 2924 to facilitate attachment of dry rack arrangements 2930 thereto. In particular, each dry rack arrangement 2930 includes a post 2932 onto which is attached a petal arrangement 2934 and a clip 2936 for clipping onto rail 2920. As shown in FIG. 29, clip 2936 is configured for matingly engaging grooves 2924 for secure attachment to rail 2920.

Figure 30:
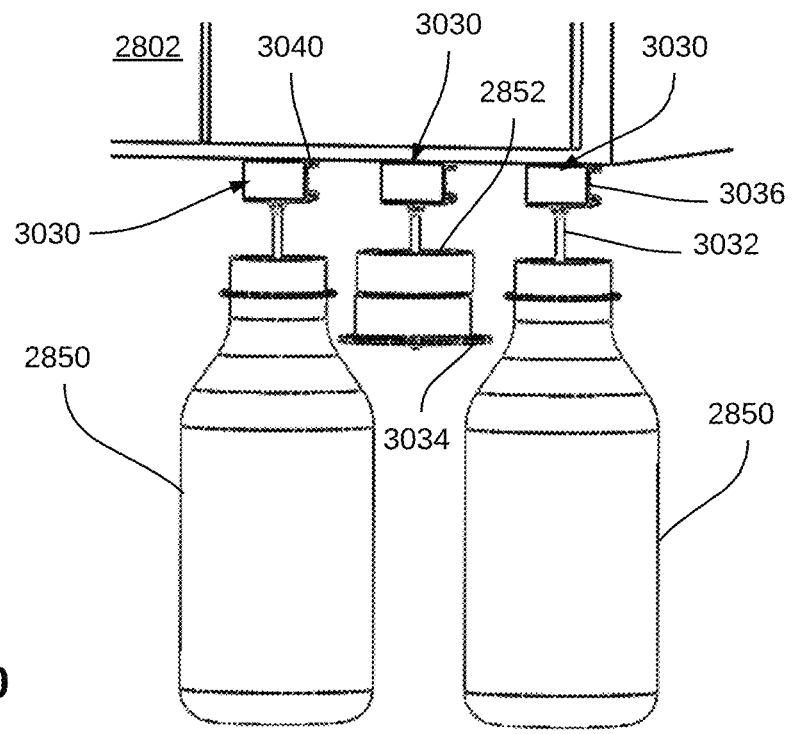
FIG. 30 shows a front view of the self-supporting dry rack arrangements, with bottles supported thereon, shown here to illustrate details of the cabinet attachments for the self-supporting dry rack arrangements, in accordance with an embodiment.

FIG. 30 shows a front view of several self-supporting dry rack arrangements 3030, with bottles supported thereon and attached to the underside of a cabinet, in accordance with an embodiment. Like previously-described dry rack arrangements, each self-supporting dry rack arrangement 3030 includes a post 3032 and a petal arrangement 3034. Additionally, each dry rack arrangement 3030 includes an attachment mechanism 3036 rather than a clip for attaching to a rail system. Attachment mechanism 3036 includes an attachment surface 3040 for mounting onto a surface, such as the underside of cabinet 2802 as shown in FIG. 30. Alternatively, attachment mechanism can be screwed, pinned, or otherwise affixed to a desired surface. Furthermore, attachment mechanism 3036 can be integrally formed from post 3032, permanently affixed to post 3032, or detachably attached to post 3032. In an exemplary embodiment, attachment mechanism 3036 includes a groove (not shown) into which post 3032 is slidably inserted.

Figure 31:
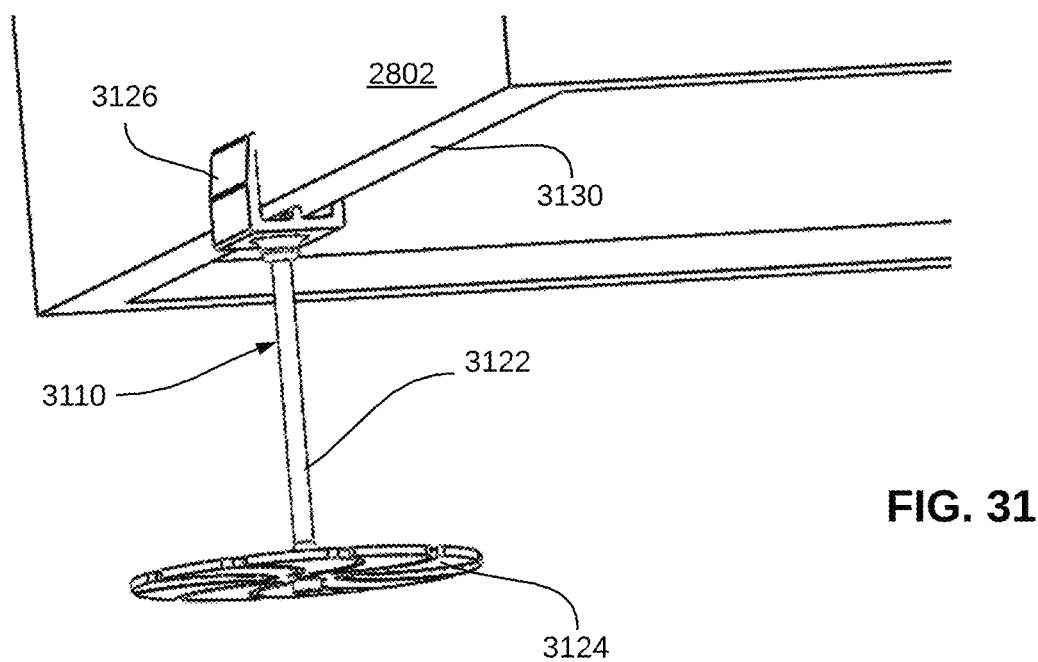
FIG. 31 shows an ISO view of an alternative, self-supporting dry rack arrangement, in accordance with an embodiment.

FIG. 31 shows an ISO view of an alternative, self-supporting dry rack arrangement, in accordance with an embodiment. As shown in FIG. 31, a self-supporting dry rack arrangement 3110 includes a post 3122 and a petal arrangement 3124, like previously described dry rack arrangements. Additionally, dry rack arrangement 3110 includes a modified clip 3126 configured for fitting around a lower trim piece 3130, which is commonly found around the bottom edge of kitchen cabinets. Modified clip 3126 can include, for example, a rubber or otherwise nonslip and/or cushioned layer to provide better grip. Modified clip 3126 can also be adjustable in width and be otherwise pliable enough to accommodate cabinet wall protrusions of various widths.

Figure 32:
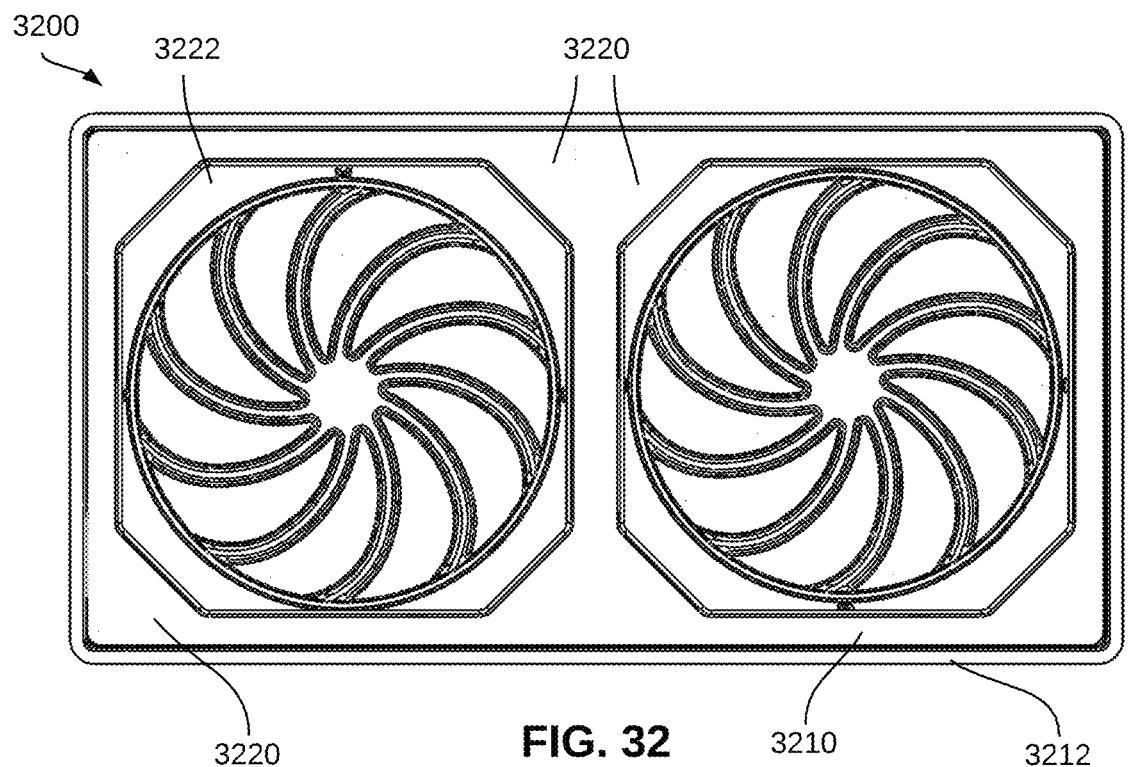
FIG. 32 shows a top view of a frame for use with an exemplary rack system, shown here with flexible inserts supported therein, in accordance with an embodiment.
Figure 33:
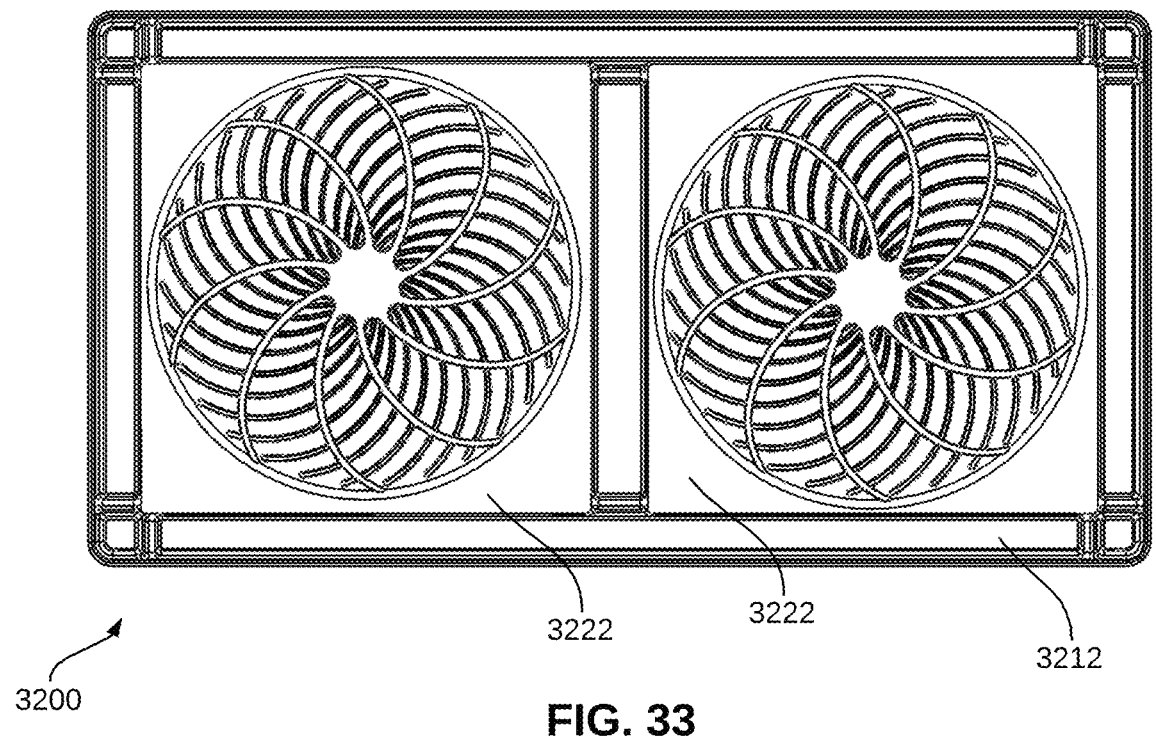
FIG. 33 shows a bottom view of the frame of FIG. 32, in accordance with an embodiment.

Referring now to FIGS. 32-37, details of a frame suitable for use with the rack systems described above are illustrated. FIGS. 32 and 33 show top and bottom views, respectively, of a frame 3200, shown here with flexible inserts 3222 supported therein, in accordance with an embodiment. As can be seen in FIG. 32, frame 3200 includes a second part 3210 encircling and supporting a first part 3212. First part 3212 includes chamfers 3220, which provides additional stability for flexible inserts 3222 as well as leverage points for the user when taking apart frame 3200. First part 3212 of frame 3200 is not visible in FIG. 32, as it is blocked from view by flexible inserts 3222.

Figure 34:
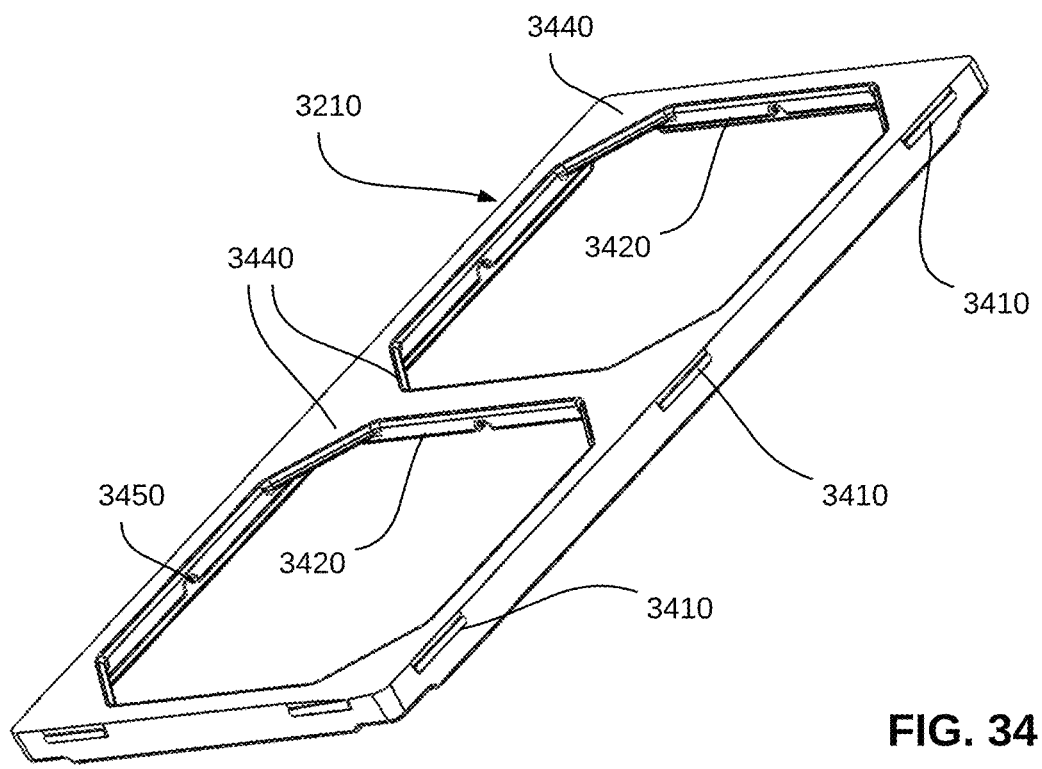
FIGS. 34 and 35 show ISO views of the disassembled first and second pieces, respectively, of the frame of FIGS. 32 and 33, in accordance with an embodiment.
Figure 35:
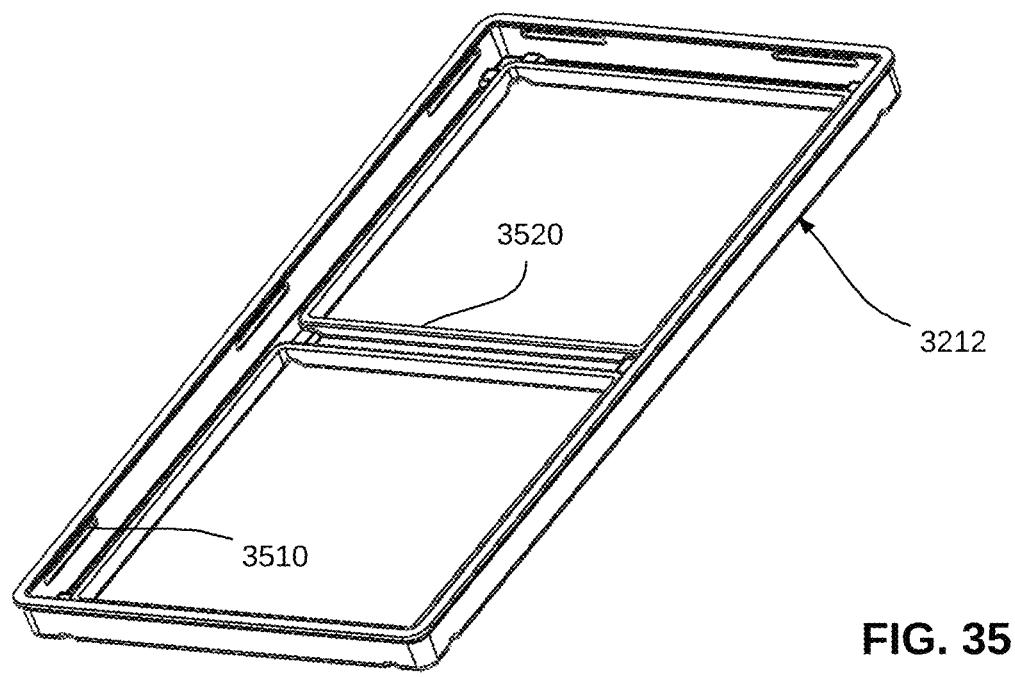

FIGS. 34 and 35 show ISO views of the disassembled first and second parts, respectively, of the frame of FIGS. 32 and 33, in accordance with an embodiment. As shown in FIGS. 34 and 35, first part 3212 further includes protrusions 3410 configured for matingly engaging depressions 3510 in second part 3210. In this embodiment, first part 3212 also includes a lip feature 3420, and second part 3210 also includes a lip feature 3520, wherein the lip features 3420 and 3520 are configured for securely supporting flexible inserts accommodated therein. Additionally, first part 3212 includes chamfers 3440 as well as notch features 3450, which are configured for accommodating key-in features, illustrated in FIG. 36.

Figure 36:
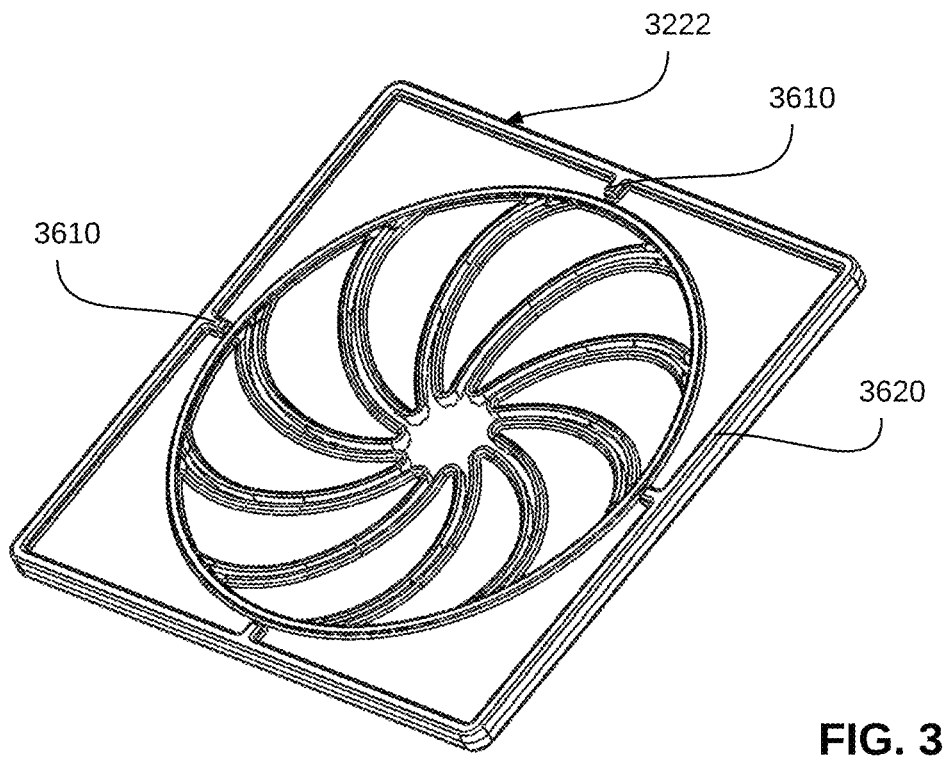
FIG. 36 shows an ISO view of a flexible insert including key-in features, in accordance with an embodiment.

FIG. 36 shows an ISO view of flexible insert 3222 including key-in features 3610 compatible with notch features 3450 of first part 3212 of the frame illustrated in FIG. 34, in accordance with an embodiment. As shown in FIG. 36, flexible insert 3222 includes key-in features 3610 as well as a lip feature 3620 along its outer perimeter for matingly engaging lip features 3420 and 3520 of first and second parts 3212 and 3210, respectively.

Figure 37:
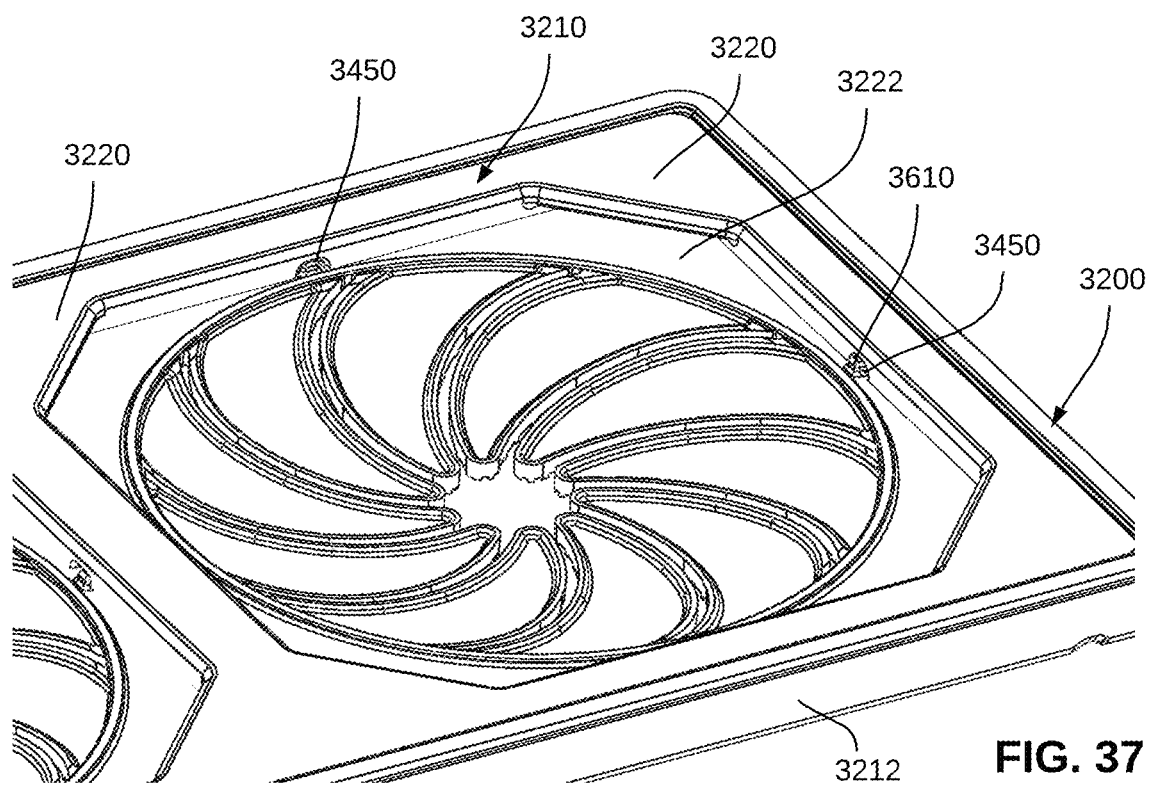
FIG. 37 shows a partial ISO view of the frame of FIGS. 32 and 33, with a flexible insert placed therein such that the key-in features of the first piece matingly engage with complementary key-in features in the flexible inserts, in accordance with an embodiment.
Figure 40:
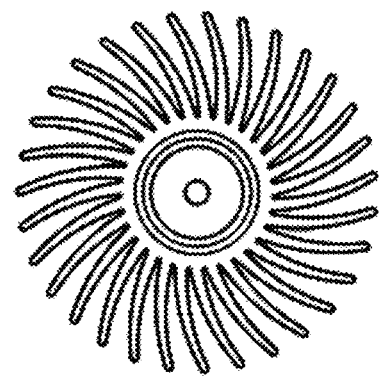
FIGS. 38-43 show top views of exemplary embodiments of petal shapes for use as part of the dry rack arrangement.
Figure 43:
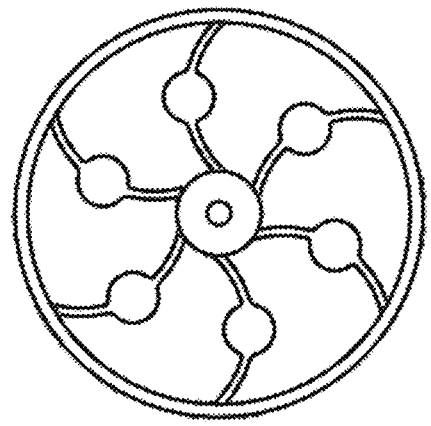
Figure 39:
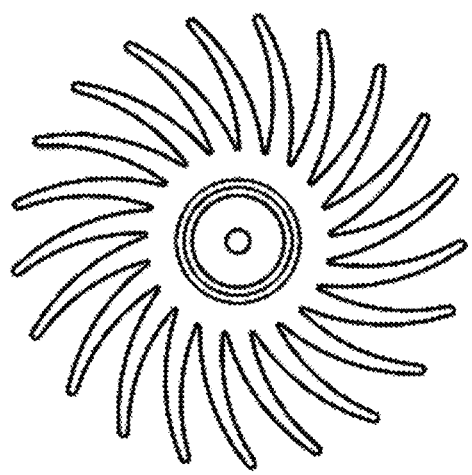
Figure 42:
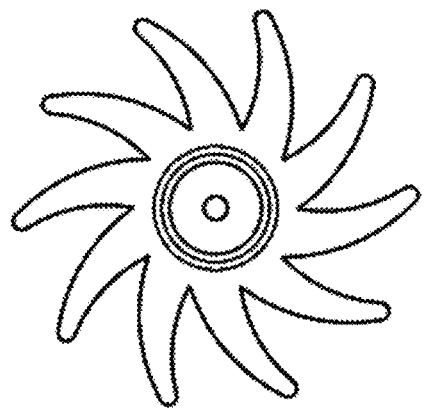
Figure 38:
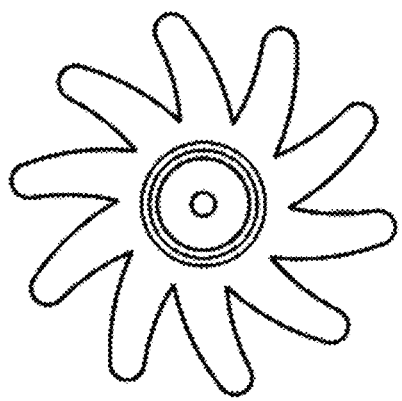

FIG. 37 shows a partial ISO view of a first part of the frame of FIGS. 32 and 33, illustrating further details of key-in (also referred to as "poka-yoke") features, in accordance with an embodiment. As shown, flexible inserts 3222 are placed within frame 3200 such that key-in features 3610 of first part 3212 matingly engage with complementary key-in features 3610 in the flexible inserts. The key-in features are configured, for example, to indicate to the user the correct way to assemble the flexible inserts and the frame.

Figure 41:
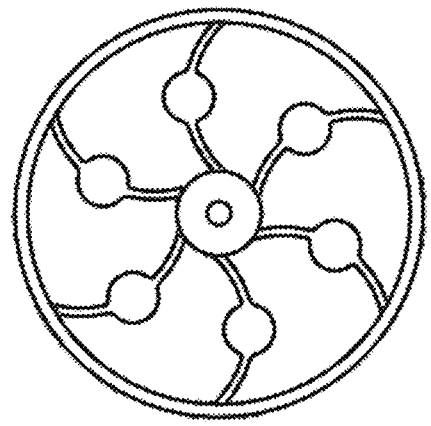

FIGS. 38-43 show top views of exemplary embodiments of petal shapes for use as part of the dry rack arrangement. Different petal designs, including petals varying in material, number, size, width, and spacing therebetween, can be used for different applications. For instance, petal shapes shown in FIGS. 38, 39, 40, and 42 are suitable for supporting bottles with a narrower mouth opening than the body of the bottle, such as bottles 2850 shown in FIG. 28. Petal shapes shown in FIGS. 38-40 and 42 can also be ideal for use as a drying rack for lighter, open items such as baby bottle nipple retainer rings. Petal shape as shown in FIG. 41, with a greater surface area for each petal can be suitable for holding heavier objects. The petal shape shown in FIG. 43 includes openings for accommodating, for example, baby bottle nipples, vent tubes, straws, or sippy cup lids. Other petal arrangement designs for other applications are also contemplated.

Figure 44:
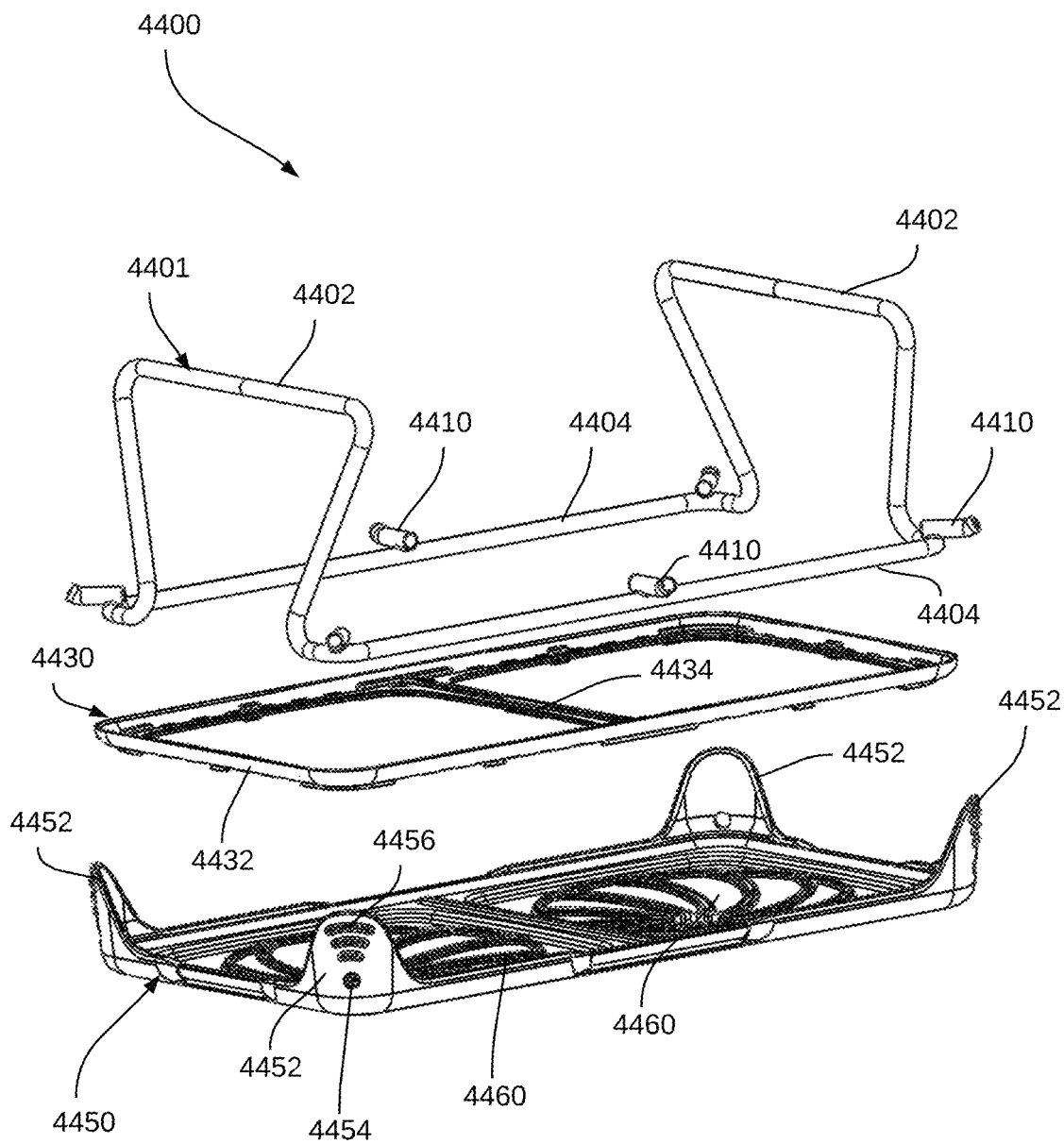
FIG. 44 shows an exploded ISO view of an exemplary rack system, in accordance with an embodiment.

FIG. 44 shows an exploded ISO view of an exemplary rack system 4400, in accordance with an embodiment. As shown in FIG. 44, an attachment frame 4401 is formed of a tubing, and/or solid wire, and includes upper bar portions 4402, lower bar portions 4404, and a plurality of hooks 4410 attached thereto. A sub-frame 4430 includes an outer frame 4432 and a support bar 4434, configured to add structural integrity to exemplary rack system 4400. Optionally, sub-frame 4430 is configured to fit or snap around lower bar portions 4404 of attachment frame 4401. Exemplary rack system 4400 further includes a membrane 4450 including thumb extensions 4452 at each corner. Each of thumb extensions 4452 includes a hole 4454 configured such that, when membrane 4450 is attached to attachment frame 4401, each hole 4454 accommodates one of hooks 4410 therethrough to help secure membrane 4450 onto attachment frame 4401. Thumb extensions 4452 optionally includes features 4456, which add stability as well as help with the gripping of thumb extensions 4452. Membrane 4450 also includes flexible portions 4460, which are equivalent to flexible inserts discussed above, configured for supporting an object inserted therein by frictional forces. While flexible portions 4460 are shown as being integrally formed from membrane 4450 in the present embodiment, the flexible portions can also be formed separately and inserted into sub-frame 4430 or membrane 4450, in an alternative embodiment.

Figure 45:
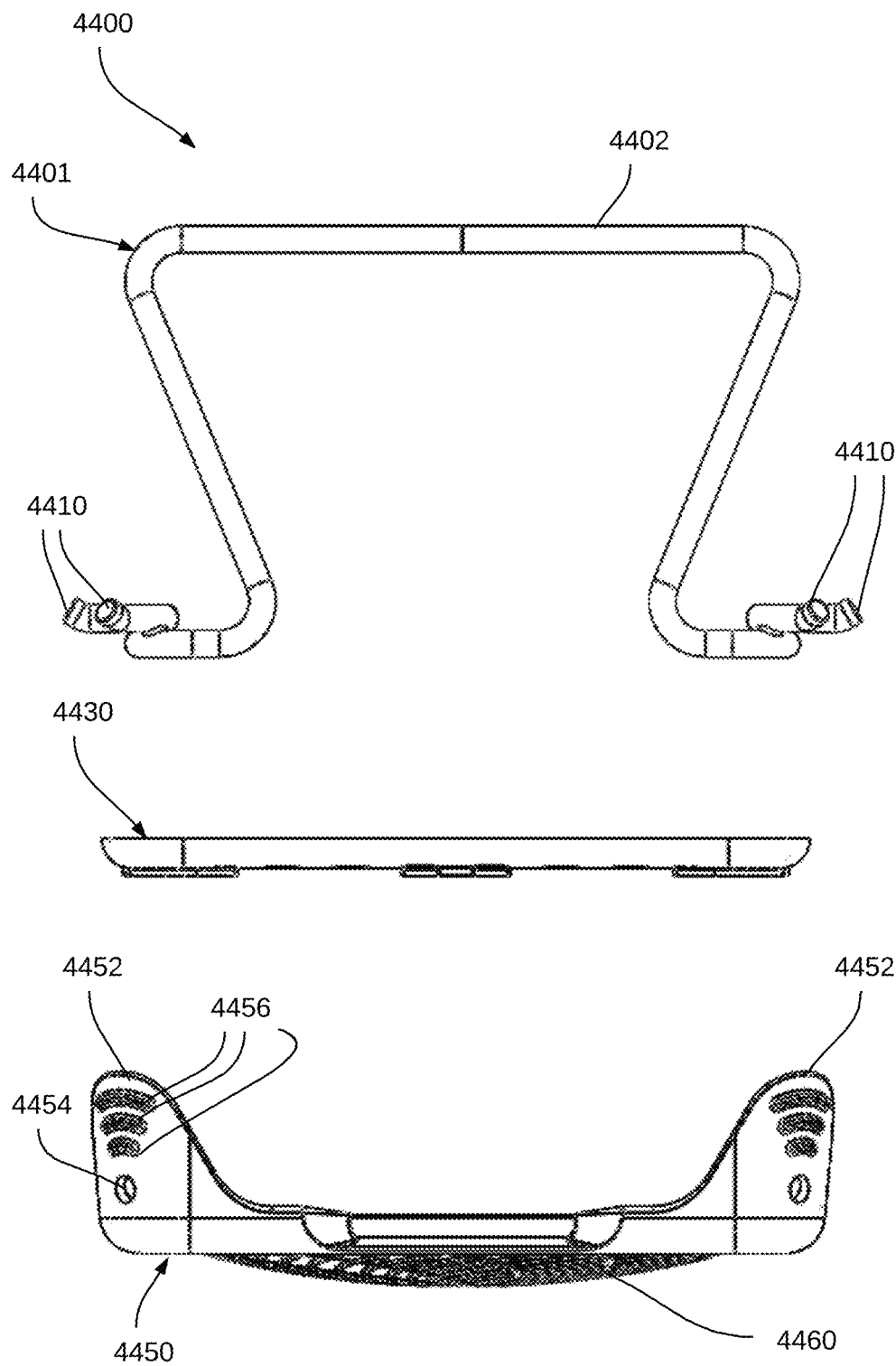
FIG. 45 shows an exploded front view of an exemplary rack system, in accordance with an embodiment.

FIG. 45 shows an exploded front view of exemplary rack system 4400, in accordance with an embodiment. Further details of thumb extensions 4452, holes 4454, and features 4456 can be seen in FIG. 45. Additionally, in the embodiment shown, flexible portion 4460 has a convex profile.

Figure 46:
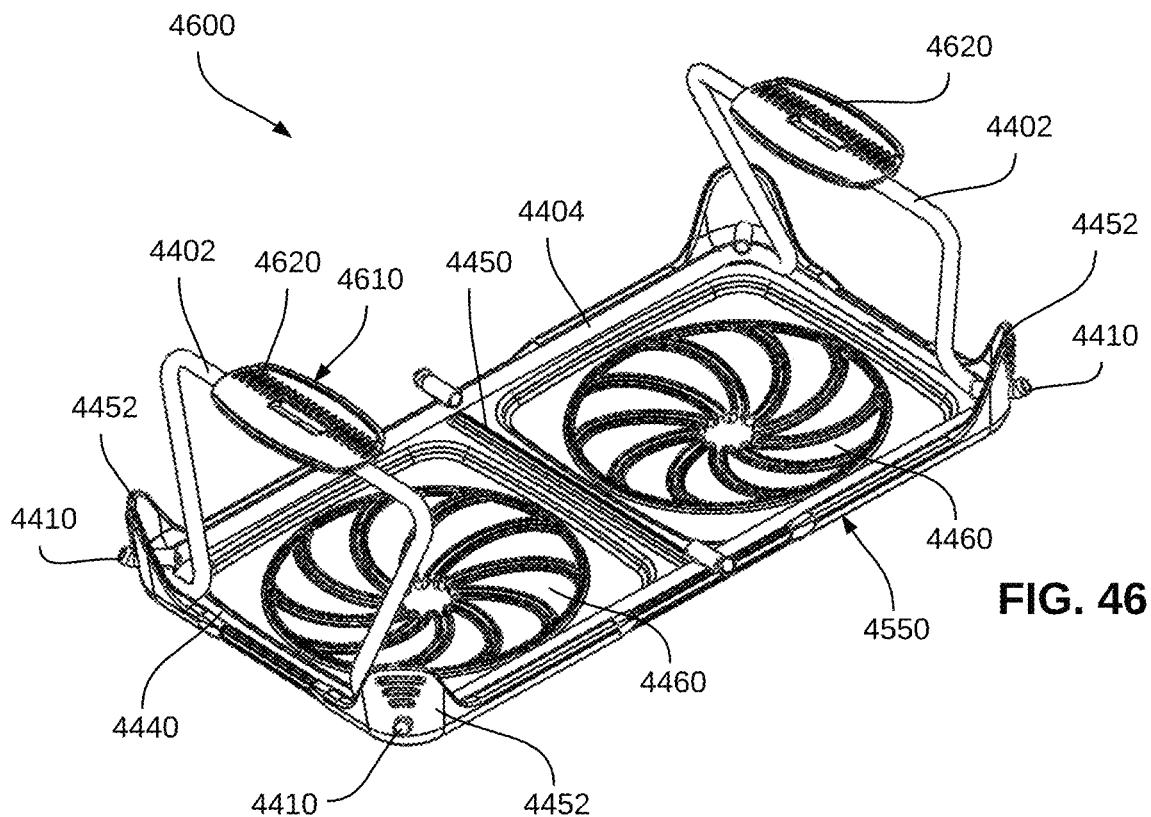
FIG. 46 shows an ISO view, from above, of an exemplary rack system as assembled, in accordance with an embodiment.

FIG. 46 shows an ISO view, from above, of an assembled rack system 4600. Assembled rack system 4600 includes the various components of exemplary rack system 4400 discussed above, as well as an attachment mechanism 4610. Attachment mechanism 4610 snaps around top bar portion 4402 and provides an attachment surface 4620, which can be used to attach the assembled rack system to a surface such as the underside of a cabinet or a vertical wall. For example, attachment surface 4620 accommodates double-sided tape, adhesive, or a hook-and-loop fastener for attaching the assembled rack system to a desired location.

Figure 47:
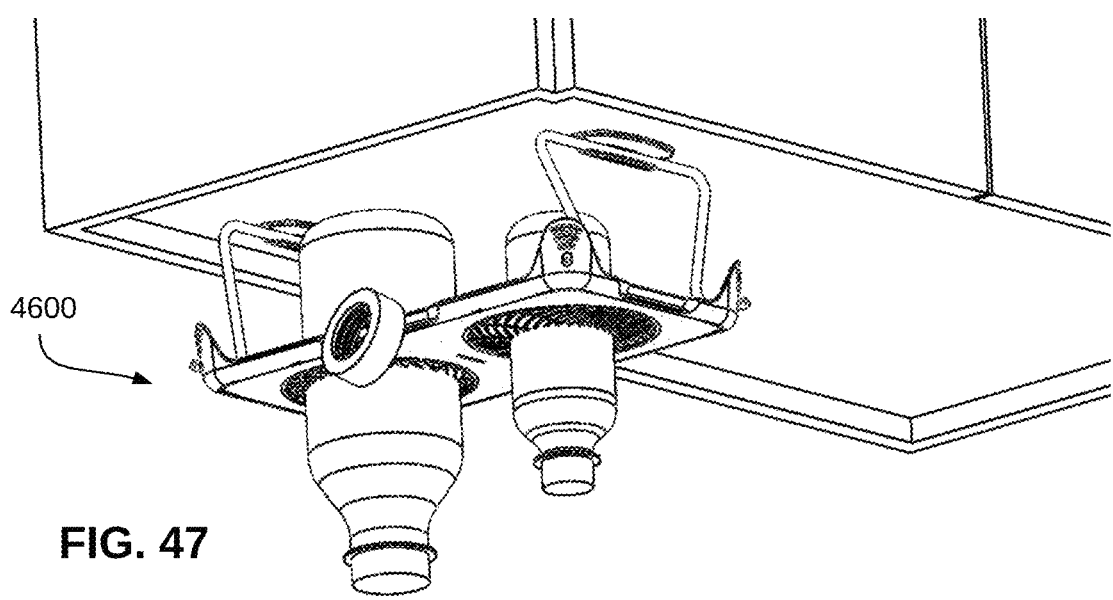
FIG. 47 shows an ISO view, from below, of an exemplary rack system, in accordance with an embodiment, as attached to the underside of a cabinet with multiple objects supported thereon.

FIG. 47 shows and ISO view, from below, of assembled rack system 4600, in accordance with an embodiment, as attached to the underside of a cabinet with multiple objects supported thereon.

Figure 48:
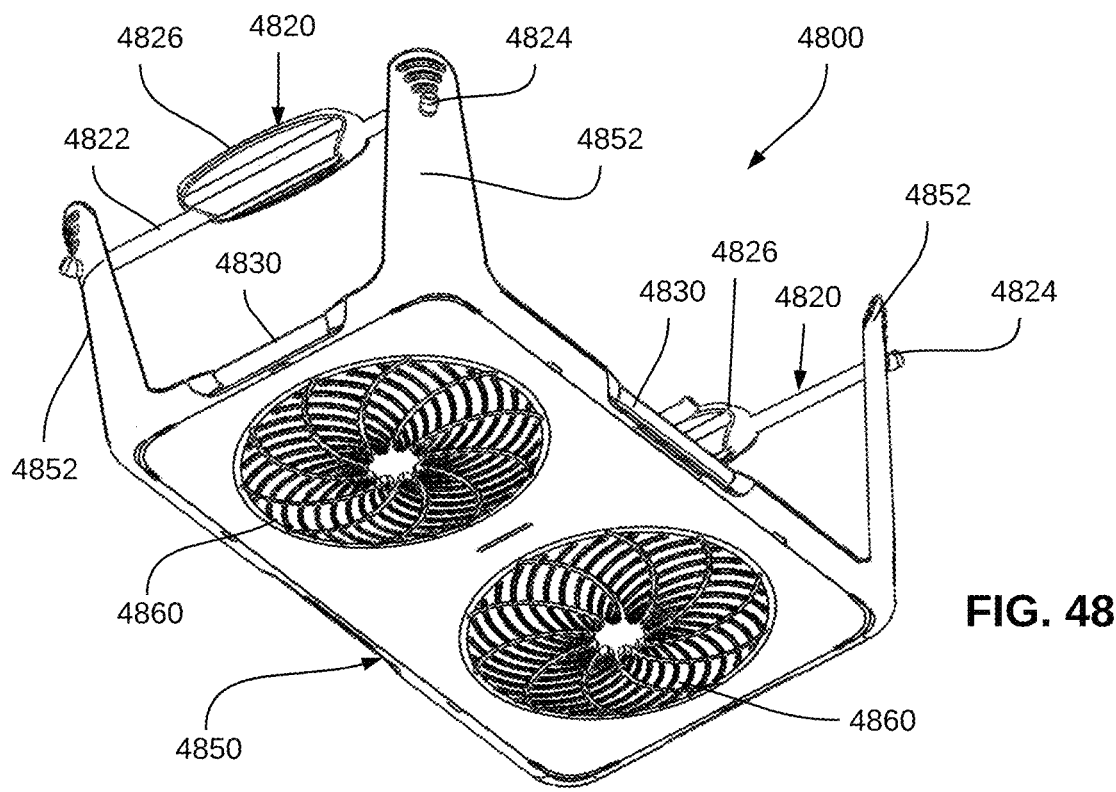
FIG. 48 shows an ISO view of an exemplary rack system with a modified attachment frame, in accordance with an embodiment.

FIG. 48 shows an ISO view of an exemplary rack system with a modified attachment mechanism, in accordance with an embodiment. A rack system 4800 includes attachment bars 4820. Each attachment bar 4820 includes an extended arm with hooks 4824 at the ends, as well as an attachment surface 4826. In the embodiment illustrated in FIG. 48, attachment bar 4820 is integrally formed as a single piece. Like the rack systems illustrated in FIGS. 44-47, rack system 4800 also includes a sub-frame 4830 and a membrane 4850. Membrane 4850 includes extended thumb extensions 4852, which are configured to be attached around hooks 4824 of attachment bars 4820. That is, in contrast to the rack systems illustrated FIGS. 44-47, membrane 4850 is sufficiently rigid so as to be attachable to attachment bars 4820 in a self-supporting manner without requiring an internal frame or any other support structure. Membrane 4850 further includes flexible portions 4860 into which objects can be inserted and held for drying or storage purposes.

Figure 49:
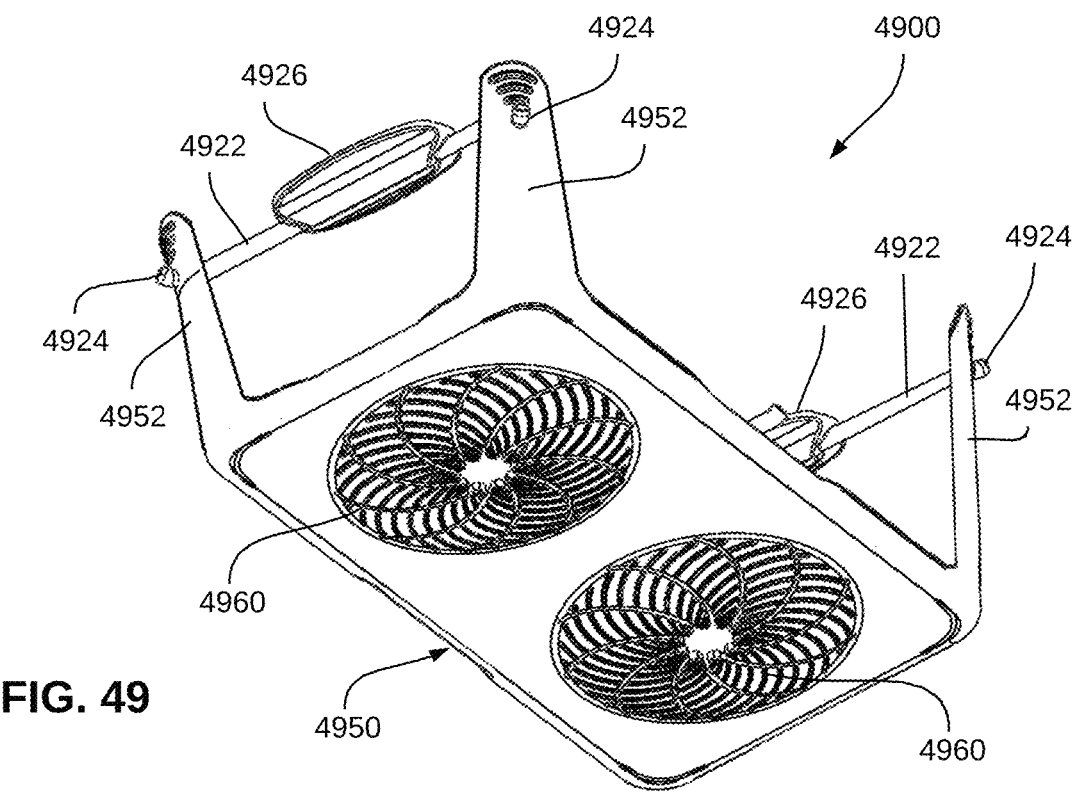
FIG. 49 shows an ISO view of an exemplary rack system with another modified attachment frame and without a subframe, in accordance with an embodiment.

FIG. 49 shows an ISO view of an exemplary rack system with another modified attachment frame and without a subframe, in accordance with an embodiment. A rack system 4900 includes attachment bars 4922 with hooks 4924 at the ends. An attachment surface 4926 is clipped or otherwise attached around each attachment bar 4922 such that attachment bars 4922 is attachable to a desired location using attachment surface 4926. Rack system 4900 further includes a membrane 4950 including extended thumb extensions 4952 configured for attaching membrane 4950 onto attachment bars 4922. In the embodiment shown in FIG. 49, membrane 4950 is formed of a sufficiently sturdy material so as to be attachable to the attachment bars in a self-supporting manner without requiring an internal frame or sub-frame or other support structure, as were required in the rack systems illustrated in FIGS. 44-47. Membrane 4950 further includes flexible portions 4960 into which objects can be inserted and held for drying or storage purposes. If flexible portions 4960 are integrally formed from membrane 4950 as a single piece, rack system 4900 essentially only includes three components: attachment bar 4922, attachment surface 4926, and membrane 4950. Furthermore, if the combination of attachment bar 4922 and attachment surface 4926 are replaced by the single piece configuration of attachment bar 4820 shown in FIG. 48, the rack system is further simplified to just two components, namely an integrated attachment bar and a modified membrane.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention.

Accordingly, many different embodiments stem from the above description and the drawings. It will be understood that it would be unduly repetitious and obfuscating to literally describe and illustrate every combination and subcombination of these embodiments. As such, the present specification, including the drawings, shall be construed to constitute a complete written description of all combinations and subcombinations of the embodiments described herein, and of the manner and process of making and using them, and shall support claims to any such combination or subcombination. For instance, while the flexible inserts and the portion of the membrane for accommodating articles are shown as circular, they can be configured in a variety of shapes and sizes, such as square, oval, and triangular. Such flexible inserts and membranes can also be flat, concave, or convex. The number and arrangement of petals can also be varied, as long as the petals provide sufficient support to hold an article inserted therein. For instance, a large number (10 to 100 or more) petals can be used, or a few (less than 10) can be used as long as the petals provide sufficient tension and friction to support an article inserted therein. The petals can be thin and needle-like, triangular, semi-circular, square, pointed, and other manufacturable shapes. The thickness of the flexible inserts and membranes, as well as the petals, can be adjusted for specific applications. For instance, if large or heavy objects are to be supported in the rack system, the flexible inserts and membranes can be formed of a thick material so as to provide adequate structural integrity and friction to support the objects. In an example, the petals can include surface texturing (e.g., as shown in FIGS. 23 and 25) for providing additional "gripping" of articles to be supported therewith. Also, the flexible inserts and membranes can be adapted for specific applications, such as for supporting specialty glassware, by adjusting the radius of curvature of the opening within the flexible inserts and membranes to match the specialty glassware. As an example, rather than the universal inserts described above that can accommodate a variety of objects of different sizes, the inserts can be tailored to the products of a particular brand of baby bottles, for example, thus providing customized snap-fit or interference fit to the components (e.g., bottles, nipples, caps, and other parts) sold by a particular manufacturer. Additionally, the brackets can be replaced by, for example, one or more hooks, screws, or other attachment mechanisms for permanently or temporarily attaching the rack system to a wall, cabinet, shelf, or other surfaces.

In the specification, there have been disclosed embodiments of the invention and, although specific terms are employed, they are used in a generic and descriptive sense only and not for purposes of limitation. Although a few exemplary embodiments of this invention have been described, those skilled in the art will readily appreciate that many modifications and extensions are possible in the exemplary embodiments without materially departing from the novel teachings and advantages of this invention. Accordingly, all such modifications and extensions are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A rack system for removably supporting a plurality of articles therein, the system comprising:
   a membrane for accommodating and supporting at least one of the plurality of articles therein, the membrane being formed of a resilient material, wherein the membrane comprises at least one flexible portion having a diameter and forming a fully enclosed opening therein; and
   a frame for supporting the membrane,
   wherein the frame includes a plurality of hooks, and
   wherein the membrane further includes a plurality of thumb extensions, each one of the plurality of thumb extensions including a hole configured for engaging with a corresponding one of the plurality of hooks on the frame.

2. The system of claim 1, wherein the membrane includes a plurality of slats forming a plurality of slits, the plurality of slats being configured for removably holding at least one of the plurality of articles therein without any additional support mechanism.

3. The system of claim 1, wherein the membrane includes at least one rib feature for adding structural integrity to the membrane.

4. The rack system of claim 1, wherein the membrane is convex.

5. The rack system of claim 4, wherein the membrane comprises a convex profile such that the membrane partially protrudes from a plane defined by the fully enclosed opening of the at least one flexible portion.

6. The rack system of claim 3, wherein the at least one rib feature is arranged on an edge of the at least one flexible portion.

7. The rack system of claim 3, wherein the at least one rib feature is arranged within the at least flexible portion.

8. The rack system of claim 1, further comprising at least one attachment mechanism for attaching the frame to an external surface.

9. The rack system of claim 8,
wherein the at least one attachment mechanism is configured for snapping around a portion of the frame, and
wherein the at least one attachment mechanism includes an attachment surface for engaging with the external surface.

10. The rack system of claim 8,
wherein the external surface includes at least one of a surface under a cabinet, a cabinet door, and a wall, and
wherein the at least one attachment mechanism is configured for attaching the bracket arrangement to the external surface such that the bracket arrangement slidably and removably accommodates the first frame therein in a selected one of a horizontal and a vertical manner.

* * * * *